US010616866B2

(12) United States Patent
Oizumi et al.

(10) Patent No.: US 10,616,866 B2
(45) Date of Patent: **\*Apr. 7, 2020**

(54) BASE STATION, AND BUFFER PARTITIONING METHOD

(71) Applicant: Sun Patent Trust, New York, NY (US)

(72) Inventors: Toru Oizumi, Kanagawa (JP); Akihiko Nishio, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,289

(22) Filed: Nov. 7, 2018

(65) Prior Publication Data

US 2019/0075556 A1   Mar. 7, 2019

Related U.S. Application Data

(63) Continuation of application No. 15/666,420, filed on Aug. 1, 2017, now Pat. No. 10,159,063, which is a (Continued)

(30) Foreign Application Priority Data

Jul. 17, 2012  (JP) ................................. 2012-158677

(51) Int. Cl.
*H04W 72/04* (2009.01)
*H04L 1/18* (2006.01)
(Continued)

(52) U.S. Cl.
CPC .......... *H04W 72/0406* (2013.01); *H04L 1/00* (2013.01); *H04L 1/1657* (2013.01);
(Continued)

(58) Field of Classification Search
None
See application file for complete search history.

(56) References Cited

U.S. PATENT DOCUMENTS 9,172,520 B1   10/2015 Cheng et al.
9,319,213 B2   4/2016 Yang et al.
(Continued)

FOREIGN PATENT DOCUMENTS

CN   101873706 A   10/2010
EP   2 814 195 A1   12/2014
(Continued)

OTHER PUBLICATIONS

Samsung, "PDSCH HARQ timing for more than 2 cell configuration," R1-122225, *3GPP TSG RAN WG1 #69*, Prague, Czech Republic, May 21-25, 2012, 4 pages.
(Continued)

*Primary Examiner* — Otis L Thompson, Jr.
(74) *Attorney, Agent, or Firm* — Seed IP Law Group LLP

(57) ABSTRACT

Disclosed is a base station which transmits and retransmits to a terminal first and second downlink data in first and second component carriers, respectively, wherein a first configuration pattern of UL (uplink) and DL (downlink) subframes is set for the first component carrier and a second configuration pattern of UL and DL subframes is set for the second component carrier. The base station receives from the terminal in the first component carrier an ACK/NACK for the first and second downlink data received by the terminal, which stores retransmission data of the first and second downlink data in a soft buffer, wherein the soft buffer for the second downlink data is sized according to a maximum number of downlink HARQ retransmission processes executable in a reference configuration pattern of UL and DL subframes, and the reference configuration pattern is determined according to the first and second configuration patterns.

16 Claims, 27 Drawing Sheets

Related U.S. Application Data continuation of application No. 15/332,980, filed on Oct. 24, 2016, now Pat. No. 9,756,618, which is a continuation of application No. 15/090,411, filed on Apr. 4, 2016, now Pat. No. 9,510,330, which is a continuation of application No. 14/237,819, filed as application No. PCT/JP2013/003643 on Jun. 11, 2013, now Pat. No. 9,338,765.

(51) Int. Cl.

| | | |
|---|---|---|
| *H04L 5/00* | (2006.01) | |
| *H04L 5/14* | (2006.01) | |
| *H04W 52/02* | (2009.01) | |
| *H04L 1/00* | (2006.01) | |
| *H04W 28/14* | (2009.01) | |
| *H04W 88/02* | (2009.01) | |
| *H04L 1/16* | (2006.01) | |
| *H04W 72/12* | (2009.01) | |

(52) U.S. Cl.
CPC .......... *H04L 1/1816* (2013.01); *H04L 1/1819* (2013.01); *H04L 1/1822* (2013.01); *H04L 1/1835* (2013.01); *H04L 5/001* (2013.01); *H04L 5/0041* (2013.01); *H04L 5/0055* (2013.01); *H04L 5/1469* (2013.01); *H04W 28/14* (2013.01); *H04W 52/0206* (2013.01); *H04W 72/04* (2013.01); *H04W 88/02* (2013.01); *H04L 1/1854* (2013.01); *H04L 5/0023* (2013.01); *H04L 5/0073* (2013.01); *H04L 5/0094* (2013.01); *H04W 72/1257* (2013.01); *Y02D 70/1262* (2018.01); *Y02D 70/1264* (2018.01); *Y02D 70/25* (2018.01)

(56) References Cited

U.S. PATENT DOCUMENTS

| | | | |
|---|---|---|---|
| 9,338,765 | B2 | 5/2016 | Oizumi et al. |
| 2007/0189282 | A1 | 8/2007 | Lohr et al. |
| 2010/0050034 | A1 | 2/2010 | Che et al. |
| 2011/0035639 | A1 | 2/2011 | Earnshaw et al. |
| 2011/0292894 | A1* | 12/2011 | Wu ................. H04L 1/1812 370/329 |
| 2012/0044871 | A1 | 2/2012 | Li et al. |
| 2012/0087396 | A1 | 4/2012 | Nimbalker et al. |
| 2012/0213170 | A1 | 8/2012 | Choi et al. |
| 2012/0263057 | A1 | 10/2012 | Choi et al. |
| 2012/0275397 | A1 | 11/2012 | Hsieh et al. |
| 2012/0307689 | A1 | 12/2012 | Kim et al. |
| 2013/0051289 | A1 | 2/2013 | Hsieh et al. |
| 2013/0070652 | A1 | 3/2013 | Li et al. |
| 2013/0114573 | A1* | 5/2013 | Suzuki ............. H04L 1/1887 370/336 |
| 2013/0121216 | A1 | 5/2013 | Chen et al. |
| 2013/0176981 | A1 | 7/2013 | Earnshaw et al. |
| 2013/0194980 | A1 | 8/2013 | Yin et al. |
| 2013/0242819 | A1 | 9/2013 | He et al. |
| 2014/0036814 | A1 | 2/2014 | Zhang et al. |
| 2014/0044066 | A1 | 2/2014 | Hsieh et al. |
| 2014/0198758 | A1 | 7/2014 | Nimbalker et al. |
| 2014/0293846 | A1 | 10/2014 | Meng et al. |
| 2014/0293883 | A1 | 10/2014 | Wang et al. |
| 2015/0009872 | A1 | 1/2015 | Yang et al. |
| 2015/0016376 | A1 | 1/2015 | Seo |
| 2015/0085782 | A1 | 3/2015 | Seo et al. |
| 2015/0131602 | A1 | 5/2015 | Kim et al. |
| 2015/0181590 | A1* | 6/2015 | Park ................. H04L 1/1812 370/280 |
| 2015/0358122 | A1 | 12/2015 | Yang et al. |

FOREIGN PATENT DOCUMENTS

| | | |
|---|---|---|
| WO | 2012/047457 A1 | 4/2012 |
| WO | 2012/161914 A1 | 11/2012 |
| WO | 2013/042936 | 3/2013 |

OTHER PUBLICATIONS

3GPP TS 36.211 V10.1.0, "3rd Generation Partnership Project; Technical Specification Group Radio Access Network; Evolved Universal Terrestrial Radio Access (E-UTRA); Physical Channels and Modulation (Release 10)," Mar. 2011, 103 pages.

3GPP TS 36.212 V10.1.0, "3rd Generation Partnership Project; Technical Specification Group Radio Access Network; Evolved Universal Terrestrial Radio Access (E-UTRA); Multiplexing and channel coding (Release 10)," Mar. 2011, 76 pages.

3GPP TS 36.213 V10.1.0, "3rd Generation Partnership Project; Technical Specification Group Radio Access Network; Evolved Universal Terrestrial Radio Access (E-UTRA); Physical layer procedures (Release 10)," Mar. 2011, 115 pages.

CATT, "UE soft buffer handling in TDD," R2-115784, Agenda Item: 6.1.1, 3GPP TSG RAN WG2 Meeting #76, San Francisco, USA, Nov. 14-18, 2011, 1 page.

English Translation of Chinese Search Report, dated Jun. 22, 2017, for corresponding Chinese Application No. 2013800020422, 9 pages.

Ericsson, ST-Ericsson, "A/N transmission in the uplink for carrier aggregation," R1-100909, Agenda Item: 7.1.6, 3GPP TSG-RAN WG1 #60, San Francisco, USA, Feb. 22-26, 2010, 4 pages.

Extended European Search Report dated Jul. 1, 2015, for corresponding EP Application No. 13819508.6-1851 / 2876957, 11 pages.

Intel Corporation, "DL Scheduling/HARQ timing issue for inter-band TDD CA," R1-122657, 3GPP TSG-RAN WG1 #69, Agenda Item: 7.2.1.5, May 21-25, 2012, Prague, Czech Republic, 5 pages.

International Search Report, dated Sep. 3, 2013, for corresponding International application No. PCT/JP2013/003643, 2 pages.

Nakao et al., "Performance enhancement of E-UTRA uplink control channel in fast fading environments," Vehicular Technology Conference, Barcelon, Apr. 26-29, 2009, 5 pages.

NTT DOCOMO, "Further evaluation of soft buffer partitioning for CA," R1-111633, Agenda Item: 6.2.1, 3GPP TSG RAN WG1 Meeting #65, Barcelona, Spain, May 9-13, 2011, 10 pages.

Panasonic, "UL ACK/NACK transmission on PUCCH for carrier aggregation," R1-091744, Agenda Item: 15.4, 3GPP TSG-RAN WG1 Meeting #57, San Francisco, USA, May 4-8, 2009, 3 pages.

Qualcomm Incorporated, "Soft buffer partitioning for CA," R1-111672, Agenda Item: 6.2.1, 3GPP TSG RAN WG1 #65, Barcelona, Spain, May 9-13, 2011, 13 pages.

Qualcomm Incorporated, "Support of CA for different TDD UL-DL configurations," R1-121793, 3GPP TSG RAN WG1 #68-BIS, Mar. 26-30, 2012, Jeju, Korea, 3 pages.

ZTE, "Uplink Control Channel Design for LTE-Advanced," R1-091702, Agenda Item: 15.4, TSG-RAN WG1 #57, San Francisco, USA, May 4-8, 2009, 6 pages.

ZTE, "HARQ timing of PDSCH on cross-carrier scheduled SCell for TDD CA with different UL-DL configurations," R1-122110, Agenda Item 7.2.1.5, 3GPP TSG RAN WG1 Meeting #69, Prague, Czech Republic, May 21-25, 2012, 7 pages.

\* cited by examiner

| UL-DL Config | MAXIMUM NUMBER OF DL HARQ PROCESSES $M_{DL\_HARQ}$ |
|---|---|
| 0 | 4 |
| 1 | 7 |
| 2 | 10 |
| 3 | 9 |
| 4 | 12 |
| 5 | 15 |
| 6 | 6 |

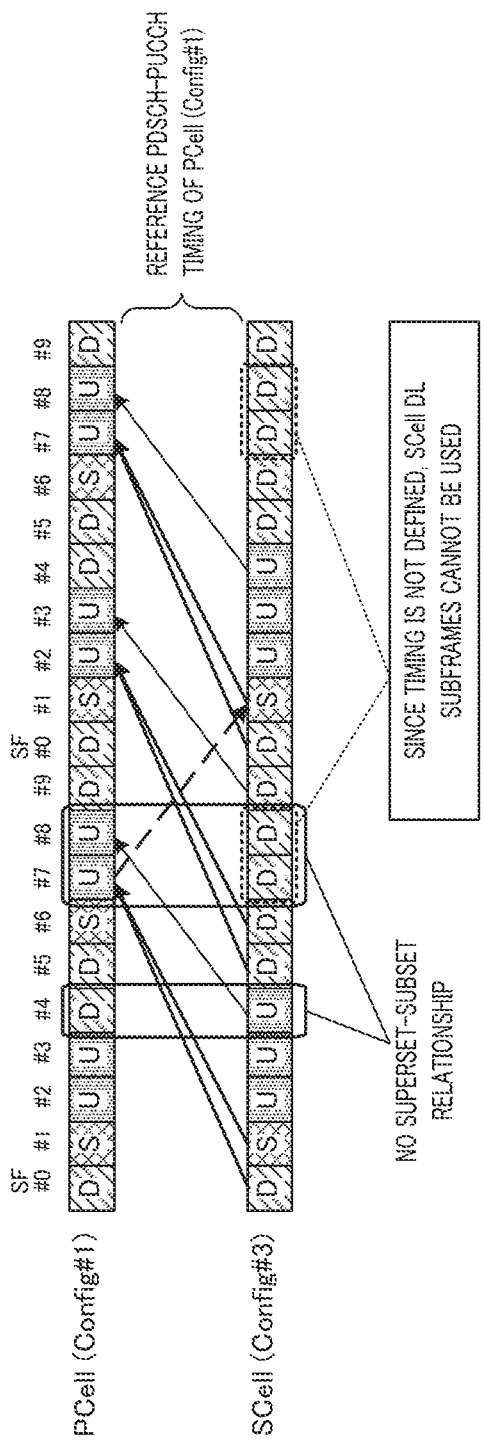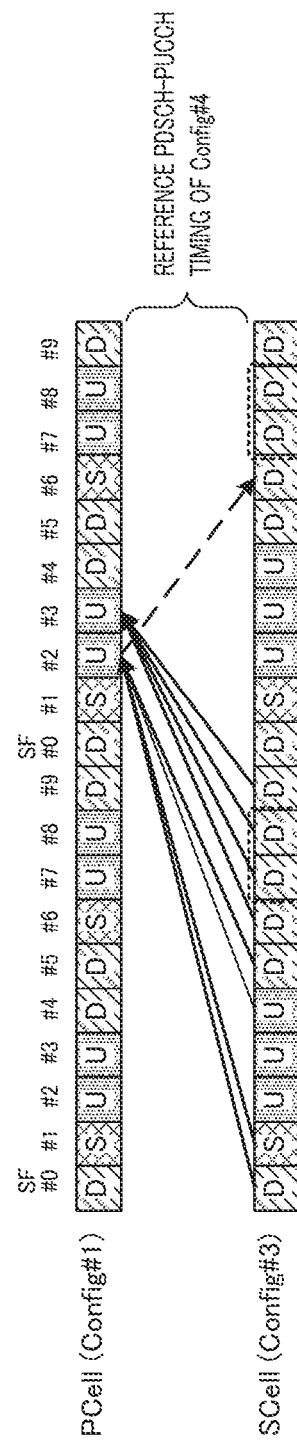
FIG. 10A
FIG. 10B

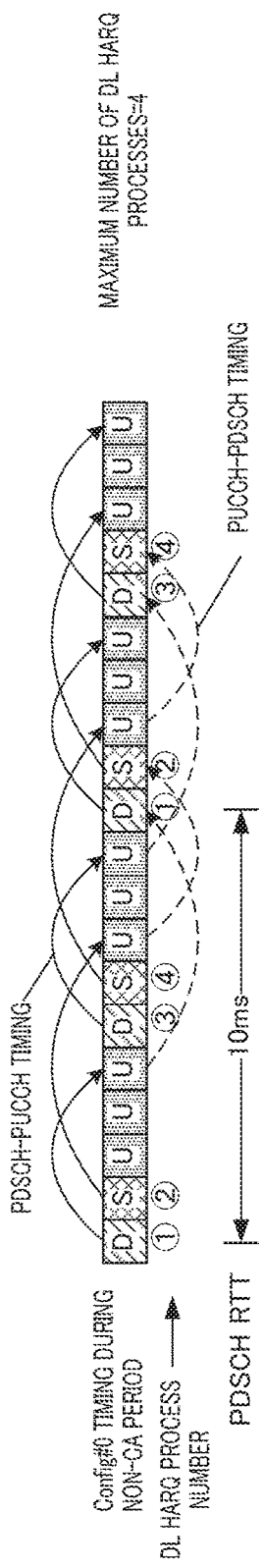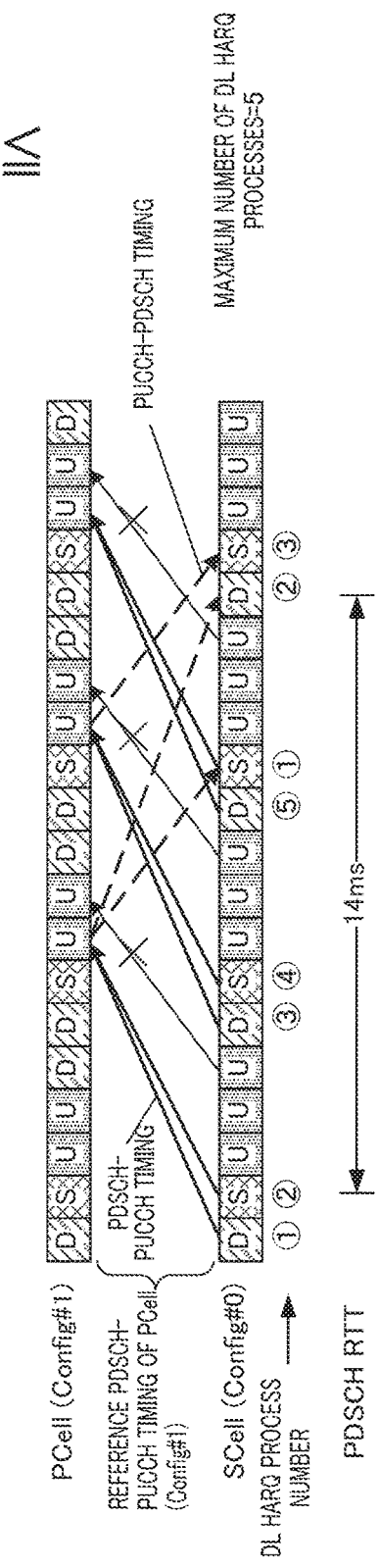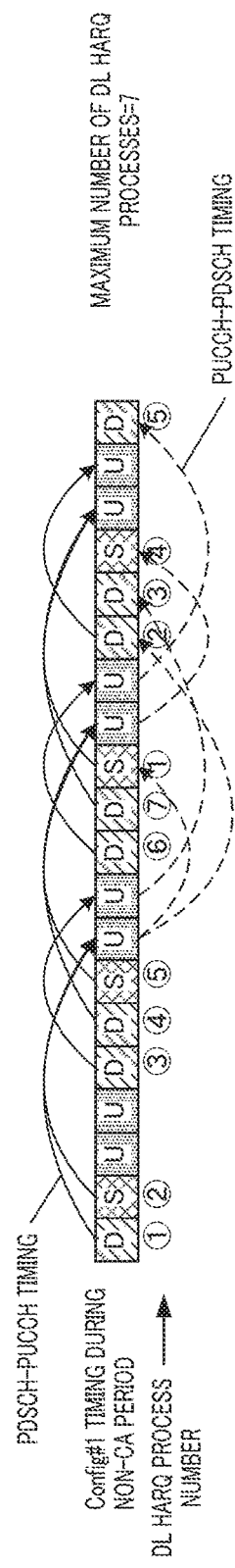

| UL-DL Config | PDSCH RTT [msec] |
|---|---|
| 0 | 10 |
| 1 | 11 |
| 2 | 12 |
| 3 | 15 |
| 4 | 16 |
| 5 | 17 |
| 6 | 14 |

FIG. 18

MAXIMUM NUMBER OF DL HARQ PROCESSES REFERENCED BY SCell

| UL-DL Config SET IN SCell | UL-DL Config set in PCell | | | | | | |
|---|---|---|---|---|---|---|---|
| | 0 | 1 | 2 | 3 | 4 | 5 | 6 |
| 0 |  | 4+1 | 4+2 | 4+2 | 4+3 | 4+3 | 4+1 |
| 1 | 7 |  | 7+1 | 7+2 | 7+3 | 7+4 | 7 |
| 2 | 10 | 10 |  | 10+4 | 10+4 | 10+4 | 10 |
| 3 | 9 | 9+1 | 9+1 |  | 9+1 | 9+2 | 9 |
| 4 | 12 | 12 | 12+1 | 12 |  | 12+1 | 12 |
| 5 | 15 | 15 | 15 | 15 | 15 |  | 15 |
| 6 | 6 | 6+0 | 6+1 | 6+1 | 6+2 | 6+3 |  |

FIG. 19A

UL-DL CONFIGURATION REFERENCED BY SCell TIMING

| UL-DL Config SET IN SCell | UL-DL Config set in PCell | | | | | | |
|---|---|---|---|---|---|---|---|
| | 0 | 1 | 2 | 3 | 4 | 5 | 6 |
| 0 |  | 1 | 2 | 3 | 4 | 5 | 6 |
| 1 | 1 |  | 2 | 4 | 4 | 5 | 6 |
| 2 | 2 | 2 |  | 4 | 4 | 5 | 1 |
| 3 | 3 | 4 | 4 |  | 4 | 5 | 2 |
| 4 | 4 | 4 | 4 | 4 |  | 5 | 3 |
| 5 | 5 | 5 | 5 | 5 | 5 |  | 4 |
| 6 | 6 | 1 | 2 | 3 | 4 | 5 |  |

Legend:
- ▨ WHEN PCell IS DL HEAVY
- ▒ WHEN PCell IS NEITHER DL HEAVY NOR UL HEAVY
- ☐ WHEN PCell IS UL HEAVY

MAXIMUM NUMBER OF DL HARQ PROCESSES REFERENCED BY SCell

| | | UL-DL Config SET IN PCell | | | | | | |
|---|---|---|---|---|---|---|---|---|
| | | 0 | 1 | 2 | 3 | 4 | 5 | 6 |
| UL-DL Config SET IN SCell | 0 | 4 | 4+1 | 4+2 | 4+2 | 4+3 | 4+3 | 4+1 |
| | 1 | 7 | 7 | 7+1 | 7+2 | 7+3 | 7+4 | 7 |
| | 2 | 10 | 10 | 10 | 10+4 | 10+4 | 10+4 | 10 |
| | 3 | 9 | 9+1 | 9+1 | 9 | 9+1 | 9+2 | 9 |
| | 4 | 12 | 12 | 12+1 | 12 | 12 | 12+1 | 12 |
| | 5 | 15 | 15 | 15 | 15 | 15 | 15 | 15 |
| | 6 | 6 | 6+0 | 6+1 | 6+1 | 6+2 | 6+3 | 6 |

FIG. 27B

UL-DL CONFIGURATION REFERENCED BY SCell TIMING

| | | UL-DL Config SET IN PCell | | | | | | |
|---|---|---|---|---|---|---|---|---|
| | | 0 | 1 | 2 | 3 | 4 | 5 | 6 |
| UL-DL Config SET IN SCell | 0 | 0 | 1 | 2 | 3 | 4 | 5 | 6 |
| | 1 | 1 | 1 | 2 | 4 | 4 | 5 | 1 |
| | 2 | 2 | 2 | 2 | 5 | 5 | 5 | 2 |
| | 3 | 3 | 4 | 5 | 3 | 4 | 5 | 3 |
| | 4 | 4 | 4 | 5 | 4 | 4 | 5 | 4 |
| | 5 | 5 | 5 | 5 | 5 | 5 | 5 | 5 |
| | 6 | 6 | 1 | 2 | 3 | 4 | 5 | 6 |

- WHEN PCell IS DL HEAVY
- WHEN PCell IS NEITHER DL HEAVY NOR UL HEAVY
- WHEN PCell IS UL HEAVY
- WHEN PCell AND SCell HAVE THE SAME UL-DL CONFIGURATION

BASE STATION, AND BUFFER PARTITIONING METHOD

BACKGROUND

Technical Field

The present invention relates to a terminal apparatus and a buffer dividing method.

Description of the Related Art

3GPP LTE employs Orthogonal Frequency Division Multiple Access (OFDMA) as a downlink communication scheme. In radio communication systems to which 3GPP LTE is applied, base stations transmit synchronization signals (i.e., Synchronization Channel: SCH) and broadcast signals (i.e., Broadcast Channel: BCH) using predetermined communication resources. Meanwhile, each terminal finds an SCH first and thereby ensures synchronization with the base station. Subsequently, the terminal reads BCH information to acquire base station-specific parameters (e.g., frequency bandwidth) (see, Non-Patent Literature (hereinafter, abbreviated as NPL) 1, 2 and 3).

In addition, upon completion of the acquisition of the base station-specific parameters, each terminal sends a connection request to the base station to thereby establish a communication link with the base station. The base station transmits control information via Physical Downlink Control CHannel (PDCCH) as appropriate to the terminal with which a communication link has been established via a downlink control channel or the like.

The terminal performs "blind-determination" on each of a plurality of pieces of control information included in the received PDCCH signal (i.e., Downlink (DL) Assignment Control Information: also referred to as Downlink Control Information (DCI)).

To put it more specifically, each piece of the control information includes a Cyclic Redundancy Check (CRC) part and the base station masks this CRC part using the terminal ID of the transmission target terminal. Accordingly, until the terminal demasks the CRC part of the received piece of control information with its own terminal ID, the terminal cannot determine whether or not the piece of control information is intended for the terminal. In this blind-determination, if the result of demasking the CRC part indicates that the CRC operation is OK, the piece of control information is determined as being intended for the terminal.

Moreover, in 3GPP LTE, Automatic Repeat Request (ARQ) is applied to downlink data to terminals from a base station. To put it more specifically, each terminal feeds back a response signal indicating the result of error detection on the downlink data to the base station. Each terminal performs a CRC on the downlink data and feeds back Acknowledgment (ACK) when CRC=OK (no error) or Negative Acknowledgment (NACK) when CRC=Not OK (error) to the base station as a response signal. An uplink control channel such as Physical Uplink Control Channel (PUCCH) is used to feed back the response signals (i.e., ACK/NACK signals (hereinafter, may be referred to as "A/N," simply)).

The control information to be transmitted from a base station herein includes resource assignment information including information on resources assigned to the terminal by the base station. As described above, PDCCH is used to transmit this control information. This PDCCH includes one or more L1/L2control channels (L1/L2CCH). Each L1/L2CCH consists of one or more Control Channel Elements (CCE). To put it more specifically, a CCE is the basic unit used to map the control information to PDCCH. Moreover, when a single L1/L2CCH consists of a plurality of CCEs (2, 4 or 8), a plurality of contiguous CCEs starting from a CCE having an even index are assigned to the L1/L2CCH. The base station assigns the L1/L2CCH to the resource assignment target terminal in accordance with the number of CCEs required for indicating the control information to the resource assignment target terminal. The base station maps the control information to physical resources corresponding to the CCEs of the L1/L2CCH and transmits the mapped control information.

In addition, CCEs are associated with component resources of PUCCH (hereinafter, may be referred to as "PUCCH resource") in a one-to-one correspondence. Accordingly, a terminal that has received an L1/L2CCH identifies the component resources of PUCCH that correspond to the CCEs forming the L1/L2CCH and transmits a response signal to the base station using the identified resources. However, when the L1/L2CCH occupies a plurality of contiguous CCEs, the terminal transmits the response signal to the base station using a PUCCH component resource corresponding to a CCE having a smallest index among the plurality of PUCCH component resources respectively corresponding to the plurality of CCEs (i.e., PUCCH component resource associated with a CCE having an even numbered CCE index). In this manner, the downlink communication resources are efficiently used.

As illustrated in FIG. 1, a plurality of response signals transmitted from a plurality of terminals are spread using a Zero Auto-correlation (ZAC) sequence having the characteristic of zero autocorrelation in time-domain, a Walsh sequence and a discrete Fourier transform (DFT) sequence, and are code-multiplexed in a PUCCH. In FIG. 1, ($W_0$, $W_1$, $W_2$, $W_3$) represent a length-4 Walsh sequence and ($F_0$, $F_1$, $F_2$) represent a length-3 DFT sequence. As illustrated in FIG. 1, ACK or NACK response signals are primary-spread over frequency components corresponding to 1 SC-FDMA symbol by a ZAC sequence (length-12) in frequency-domain. To put it more specifically, the length-12 ZAC sequence is multiplied by a response signal component represented by a complex number. Subsequently, the ZAC sequence serving as the response signals and reference signals after the primary-spread is secondary-spread in association with each of a Walsh sequence (length-4: $W_0$-$W_3$ (may be referred to as Walsh Code Sequence)) and a DFT sequence (length-3: $F_0$-$F_2$). To put it more specifically, each component of the signals of length-12 (i.e., response signals after primary-spread or ZAC sequence serving as reference signals (i.e., Reference Signal Sequence) is multiplied by each component of an orthogonal code sequence (i.e., orthogonal sequence: Walsh sequence or DFT sequence). Moreover, the secondary-spread signals are transformed into signals of length-12 in the time-domain by inverse fast Fourier transform (IFFT). A CP is added to each signal obtained by IFFT processing, and the signals of one slot consisting of seven SC-FDMA symbols are thus formed.

The response signals from different terminals are spread using ZAC sequences each corresponding to a different cyclic shift value (i.e., index) or orthogonal code sequences each corresponding to a different sequence number (i.e., orthogonal cover index (OC index)). An orthogonal code sequence is a combination of a Walsh sequence and a DFT sequence. In addition, an orthogonal code sequence is referred to as a block-wise spreading code in some cases. Thus, base stations can demultiplex the code-multiplexed plurality of response signals using the related art despreading and correlation processing (see, NPL 4).

However, it is not necessarily true that each terminal succeeds in receiving downlink assignment control signals because the terminal performs blind-determination in each subframe to find downlink assignment control signals intended for the terminal. When the terminal fails to receive the downlink assignment control signals intended for the terminal on a certain downlink component carrier, the terminal would not even know whether or not there is downlink data intended for the terminal on the downlink component carrier. Accordingly, when a terminal fails to receive the downlink assignment control signals intended for the terminal on a certain downlink component carrier, the terminal generates no response signals for the downlink data on the downlink component carrier. This error case is defined as discontinuous transmission of ACK/NACK signals (DTX of response signals) in the sense that the terminal transmits no response signals.

In 3GPP LTE systems (may be referred to as "LTE system," hereinafter), base stations assign resources to uplink data and downlink data, independently. For this reason, in the 3GPP LTE system, terminals (i.e., terminals compliant with LTE system (hereinafter, referred to as "LTE terminal")) encounter a situation where the terminals need to transmit uplink data and response signals for downlink data simultaneously in the uplink. In this situation, the response signals and uplink data from the terminals are transmitted using time-division multiplexing (TDM). As described above, the single carrier properties of transmission waveforms of the terminals are maintained by the simultaneous transmission of response signals and uplink data using TDM.

In addition, as illustrated in FIG. 2, the response signals (i.e., "A/N") transmitted from each terminal partially occupy the resources assigned to uplink data (i.e., Physical Uplink Shared CHannel (PUSCH) resources) (i.e., response signals occupy some SC-FDMA symbols adjacent to SC-FDMA symbols to which reference signals (RS) are mapped) and are thereby transmitted to a base station in time-division multiplexing (TDM). However, "subcarriers" in the vertical axis in FIG. 2 are also termed as "virtual subcarriers" or "time contiguous signals," and "time contiguous signals" that are collectively inputted to a discrete Fourier transform (DFT) circuit in a SC-FDMA transmitter are represented as "subcarriers" for convenience. To put it more specifically, optional data of the uplink data is punctured due to the response signals in the PUSCH resources. Accordingly, the quality of uplink data (e.g., coding gain) is significantly reduced due to the punctured bits of the coded uplink data. For this reason, base stations instruct the terminals to use a very low coding rate and/or to use very large transmission power so as to compensate for the reduced quality of the uplink data due to the puncturing.

Meanwhile, the standardization of 3GPP LTE-Advanced for realizing faster communication than 3GPP LTE is in progress. 3GPP LTE-Advanced systems (may be referred to as "LTE-A system," hereinafter) follow LTE systems. 3GPP LTE-Advanced will introduce base stations and terminals capable of communicating with each other using a wideband frequency of 40 MHz or greater to realize a downlink transmission rate of up to 1 Gbps or above.

In the LTE-A system, in order to simultaneously achieve backward compatibility with the LTE system and ultra-high-speed communication several times faster than transmission rates in the LTE system, the LTE-A system band is divided into "component carriers" of 20 MHz or below, which is the bandwidth supported by the LTE system. In other words, the "component carrier" is defined herein as a band having a maximum width of 20 MHz and as the basic unit of communication band. In the Frequency Division Duplex (FDD) system, moreover, "component carrier" in downlink (hereinafter, referred to as "downlink component carrier") is defined as a band obtained by dividing a band according to downlink frequency bandwidth information in a BCH broadcasted from a base station or as a band defined by a distribution width when a downlink control channel (PDCCH) is distributed in the frequency domain. In addition, "component carrier" in uplink (hereinafter, referred to as "uplink component carrier") may be defined as a band obtained by dividing a band according to uplink frequency band information in a BCH broadcasted from a base station or as the basic unit of a communication band of 20 MHz or below including a Physical Uplink Shared CHannel (PUSCH) in the vicinity of the center of the bandwidth and PUCCHs for LTE on both ends of the band. In addition, the term "component carrier" may be also referred to as "cell" in English in 3GPP LTE-Advanced. Furthermore, "component carrier" may also be abbreviated as CC(s).

In the Time Division Duplex (TDD) system, a downlink component carrier and an uplink component carrier have the same frequency band, and downlink communication and uplink communication are realized by switching between the downlink and uplink on a time division basis. For this reason, in the case of the TDD system, the downlink component carrier can also be expressed as "downlink communication timing in a component carrier." The uplink component carrier can also be expressed as "uplink communication timing in a component carrier." The downlink component carrier and the uplink component carrier are switched based on a UL-DL configuration as shown in FIG. 3.

In the UL-DL configuration shown in FIG. 3, timings are configured in subframe units (that is, 1 msec units) for downlink communication (DL) and uplink communication (UL) per frame (10 msec). The UL-DL configuration can construct a communication system capable of flexibly meeting a downlink communication throughput requirement and an uplink communication throughput requirement by changing a subframe ratio between downlink communication and uplink communication. For example, FIG. 3 illustrates UL-DL configurations (Config 0 to 6) having different subframe ratios between downlink communication and uplink communication. In addition, in FIG. 3, a downlink communication subframe is represented by "D," an uplink communication subframe is represented by "U" and a special subframe is represented by "S." Here, the special subframe is a subframe at the time of switchover from a downlink communication subframe to an uplink communication subframe. In the special subframe, downlink data communication may be performed as in the case of the downlink communication subframe.

In each UL-DL configuration shown in FIG. 3, subframes (20 subframes) corresponding to 2 frames are expressed in two stages: subframes ("D" and "S" in the upper row) used for downlink communication and subframes ("U" in the lower row) used for uplink communication. Furthermore, as shown in FIG. 3, an error detection result corresponding to downlink data (ACK/NACK) is indicated in the fourth uplink communication subframe or an uplink communication subframe after the fourth subframe after the subframe to which the downlink data is assigned.

The LTE-A system supports communication using a band obtained by bundling some component carriers, so-called carrier aggregation (CA). Note that while a UL-DL configuration can be set for each component carrier, an LTE-A system compliant terminal (hereinafter, referred to as "LTE-A terminal") is designed assuming that the same UL-DL configuration is set among a plurality of component carriers.

FIGS. 4A and 4B are diagrams provided for describing asymmetric carrier aggregation and a control sequence thereof applicable to individual terminals.

As illustrated in FIG. 4B, a configuration in which carrier aggregation is performed using two downlink component carriers and one uplink component carrier on the left is set for terminal 1, while a configuration in which the two downlink component carriers identical with those used by terminal 1 are used but uplink component carrier on the right is used for uplink communication is set for terminal 2.

Referring to terminal 1, a base station included in an LTE-A system (that is, LTE-A system compliant base station (hereinafter, referred to as "LTE-A base station") and an LTE-A terminal included in the LTE-A system transmit and receive signals to and from each other in accordance with the sequence diagram illustrated in FIG. 4A. As illustrated in FIG. 4A, (1) terminal 1 is synchronized with the downlink component carrier on the left when starting communications with the base station and reads information on the uplink component carrier paired with the downlink component carrier on the left from a broadcast signal called system information block type 1 (SIB1). (2) Using this uplink component carrier, terminal 1 starts communication with the base station by transmitting, for example, a connection request to the base station. (3) When determining that a plurality of downlink component carriers need to be assigned to the terminal, the base station instructs the terminal to add a downlink component carrier. However, in this case, the number of uplink component carriers does not increase, and terminal 1, which is an individual terminal, starts asymmetric carrier aggregation.

In addition, in the LTE-A system to which carrier aggregation is applied, a terminal may receive a plurality of pieces of downlink data on a plurality of downlink component carriers at a time. In LTE-A, channel selection (also referred to as "multiplexing"), bundling and a discrete Fourier transform spread orthogonal frequency division multiplexing (DFT-S-OFDM) format are available as a method of transmitting a plurality of response signals for the plurality of pieces of downlink data. In channel selection, a terminal causes not only symbol points used for response signals, but also the resources to which the response signals are mapped to vary in accordance with the pattern for results of the error detection on the plurality of pieces of downlink data. Compared with channel selection, in bundling, the terminal bundles ACK or NACK signals generated according to the results of error detection on the plurality of pieces of downlink data (i.e., by calculating a logical AND of the results of error detection on the plurality of pieces of downlink data, provided that ACK=1 and NACK=0), and response signals are transmitted using one predetermine resource. In transmission using the DFT-S-OFDM format, a terminal jointly encodes (i.e., joint coding) the response signals for the plurality of pieces of downlink data and transmits the coded data using the format (see, NPL 5). For example, a terminal may feed back the response signals (i.e., ACK/NACK) using channel selection, bundling or DFT-S-OFDM according to the number of bits for a pattern for results of error detection. Alternatively, a base station may previously configure the method of transmitting the response signals.

Channel Selection is a technique that varies not only the phase points (i.e., constellation points) for the response signals but also the resources used for transmission of the response signals (may be referred to as "PUCCH resource," hereinafter) on the basis of whether the results of error detection on the plurality of pieces of downlink data for each downlink component carrier received on the plurality of downlink component carriers (a maximum of two downlink component carriers) are each an ACK or NACK as illustrated in FIG. 5. Meanwhile, bundling is a technique that bundles ACK/NACK signals for the plurality of pieces of downlink data into a single set of signals and thereby transmits the bundled signals using one predetermined resource (see, NPLs 6 and 7). Hereinafter, the set of the signals formed by bundling ACK/NACK signals for a plurality of pieces of downlink data into a single set of signals may be referred to as "bundled ACK/NACK signals."

The following two methods are considered as a possible method of transmitting response signals in uplink when a terminal receives downlink assignment control information via a PDCCH and receives downlink data.

One of the methods is to transmit response signals using a PUCCH resource associated in a one-to-one correspondence with a control channel element (CCE) occupied by the PDCCH (i.e., implicit signaling) (hereinafter, method 1). More specifically, when DCI intended for a terminal served by a base station is mapped in a PDCCH region, each PDCCH occupies a resource consisting of one or a plurality of contiguous CCEs. In addition, as the number of CCEs occupied by a PDCCH (i.e., the number of aggregated CCEs: CCE aggregation level), one of aggregation levels 1, 2, 4 and 8 is selected according to the number of information bits of the assignment control information or a propagation path condition of the terminal, for example.

The other method is to previously indicate a PUCCH resource to each terminal from a base station (i.e., explicit signaling) (hereinafter, method 2). To put it differently, each terminal transmits response signals using the PUCCH resource previously indicated by the base station in method 2.

Furthermore, as shown in FIG. 5, the terminal transmits response signals using one of two component carriers. A component carrier that transmits such response signals is called "primary component carrier (PCC) or primary cell (PCell)." The other component carrier is called "secondary component carrier (SCC) or secondary cell (SCell)." For example, the PCC (PCell) is a component carrier that transmits broadcast information on a component carrier that transmits response signals (e.g., system information block type 1 (SIB1)).

In method 2, PUCCH resources common to a plurality of terminals (e.g., four PUCCH resources) may be previously indicated to the terminals from a base station. For example, terminals may employ a method to select one PUCCH resource to be actually used, on the basis of a transmit power control (TPC) command of two bits included in DCI in SCell. In this case, the TPC command is also called an ACK/NACK resource indicator (ARI). Such a TPC command allows a certain terminal to use an explicitly signaled PUCCH resource in a certain subframe while allowing another terminal to use the same explicitly signaled PUCCH resource in another subframe in the case of explicit signaling.

Meanwhile, in channel selection, a PUCCH resource in an uplink component carrier associated in a one-to-one correspondence with the top CCE index of the CCEs occupied by the PDCCH indicating the PDSCH in PCC (PCell) (i.e., PUCCH resource in PUCCH region 1 in FIG. 5) is assigned (implicit signaling).

Here, ARQ control using channel selection when the above asymmetric carrier aggregation is applied to a terminal will be described with reference to FIG. 5 and FIGS. 6A and 6B.

For example, in FIG. 5, a component carrier group (may be referred to as "component carrier set" in English) consisting of component carrier 1 (PCell) and component carrier 2 (SCell) is set for terminal 1. In this case, after downlink resource assignment information is transmitted to terminal 1 from the base station via a PDCCH of each of component carriers 1 and 2, downlink data is transmitted using the resource corresponding to the downlink resource assignment information.

Furthermore, in channel selection, response signals representing error detection results corresponding to a plurality of pieces of downlink data in component carrier 1 (PCell) and error detection results corresponding to a plurality of pieces of downlink data in component carrier 2 (SCell) are mapped to PUCCH resources included in PUCCH region 1 or PUCCH region 2. The terminal uses two types of phase points (Binary Phase Shift Keying (BPSK) mapping) or four types of phase points (Quadrature Phase Shift Keying (QPSK) mapping) as response signals thereof. That is, in channel selection, it is possible to express a pattern for results of error detection corresponding to a plurality of pieces of downlink data in component carrier 1 (PCell) and the results of error detection corresponding to a plurality of pieces of downlink data in component carrier 2 (SCell) by a combination of PUCCH resources and phase points.

Here, FIG. 6A shows a method of mapping a pattern for results of error detection when the number of component carriers is two (one PCell, one SCell) in a TDD system.

Note that FIG. 6A assumes a case where the transmission mode is set to one of (a), (b) and (c) below.

(a) A transmission mode in which each component carrier supports only one-CW (codeword) downlink transmission.

(b) A transmission mode in which one component carrier supports only one-CW downlink transmission and the other component carrier supports up to two-CW downlink transmission.

(c) A transmission mode in which each component carrier supports up to two-CW downlink transmission.

Furthermore, FIG. 6A assumes a case where number M is set in one of (1) to (4) below, M indicating how many downlink communication subframes per component carrier (hereinafter, described as "DL (DownLink) subframes," "D" or "S" shown in FIG. 3) of results of error detection need to be indicated to the base station using one uplink communication subframe (hereinafter, described as "UL (UpLink) subframe," "U" shown in FIG. 3). For example, in Config 2 shown in FIG. 3, since results of error detection of four DL subframes are indicated to the base station using one UL subframe, M=4.

(1) M=1
(2) M=2
(3) M=3
(4) M=4

That is, FIG. 6A illustrates a method of mapping a pattern for results of error detection when (a) to (c) above are combined with (1) to (4) above. The value of M varies depending on UL-DL configuration (Config 0 to 6) and subframe number (SF #0 to SF #9) in one frame as shown in FIG. 3. Furthermore, in Config 5 shown in FIG. 3, M=9 in subframe (SF) #2. However, in this case, in the LTE-A TDD system, the terminal does not apply channel selection and indicates the results of error detection using, for example, a DFT-S-OFDM format. For this reason, in FIG. 6A, Config 5 (M=9) is not included in the combination.

In the case of (1), the number of error detection result patterns is $2^2 \times 1=4$ patterns, $2^3 \times 1=8$ patterns and $2^4 \times 1=16$ patterns in order of (a), (b) and (c). In the case of (2), the number of error detection result patterns is $2^2 \times 2=8$ patterns, $2^3 \times 2=16$ patterns, $2^4 \times 2=32$ patterns in order of (a), (b) and (c). The same applies to (3) and (4).

Here, it is assumed that the phase difference between phase points to be mapped in one PUCCH resource is 90 degrees at minimum (that is, a case where a maximum of 4 patterns per PUCCH resource are mapped). In this case, the number of PUCCH resources necessary to map all error detection result patterns is $2^4 \times 4 \div 4=16$ in (4) and (c) when the number of error detection result patterns is a maximum ($2^4 \times 4=64$ patterns), which is not realistic. Thus, the TDD system intentionally reduces the amount of information on the results of error detection by bundling the results of error detection in a spatial region or further in a time domain if necessary. In this way, the TDD system limits the number of PUCCH resources necessary to indicate the error detection result patterns.

In the LTE-A TDD system, in the case of (1), the terminal maps 4 patterns, 8 patterns and 16 patterns of results of error detection in order of (a), (b) and (c) to 2, 3 and 4 PUCCH resources respectively without bundling the results of error detection (Step3 in FIG. 6A). That is, the terminal indicates an error detection result using 1 bit per component carrier in which a transmission mode (non-MIMO) supporting only one-CW transmission in downlink and indicates error detection results using 2 bits per component carrier in which a transmission mode (MIMO) supporting up to two-CW transmissions in downlink.

In the LTE-A TDD system, in the cases of (2) and (a), the terminal maps eight patterns of results of error detection to four PUCCH resources without bundling the results of error detection (Step3 in FIG. 6A). In that case, the terminal indicates error detection results using 2 bits per downlink component carrier.

In the LTE-A TDD system, in the cases of (2) and (b) (the same applies to (2) and (c)), the terminal bundles the results of error detection of component carriers in which a transmission mode supporting up to two-CW transmission in downlink is set in a spatial region (spatial bundling) (Step 1 in FIG. 6A). In the spatial bundling, when the result of error detection corresponding to at least one CW of two CWs of the results of error detection is NACK, the terminal determines the results of error detection after the spatial bundling to be NACK. That is, in spatial bundling, logical AND of the results of error detection of two CWs is taken. The terminal then maps error detection result patterns after spatial bundling (8 patterns in the cases of (2) and (b), 16 patterns in the cases of (2) and (c)) to four PUCCH resources (Step3 in FIG. 6A). In that case, the terminal indicates error detection results using 2 bits per downlink component carrier.

In the LTE-A TDD system, in the cases of (3) or (4), and (a), (b) or (c), the terminal performs bundling in the time domain (time-domain bundling) after the spatial bundling (Step1 in FIG. 6A) (Step2 in FIG. 6A). The terminal then maps the error detection result patterns after the time-domain bundling to four PUCCH resources (Step3 in FIG. 6A). In that case, the terminal indicates results of error detection using 2 bits per downlink component carrier.

Next, an example of more specific mapping methods will be described with reference to FIG. 6B. FIG. 6B shows an example of a case where the number of downlink component carriers is 2 (one PCell, one SCell) and a case where "(c) a transmission mode in which each component carrier supports up to two-CW downlink transmission" is set and a case with "(4) M=4."

In FIG. 6B, the results of error detection of a PCell are (ACK (A), ACK), (ACK, ACK), (NACK (N), NACK) and (ACK, ACK) in order of (CW0, CW1) in four DL subframes (SF1 to 4). In the PCell shown in FIG. 6B, M=4, and therefore the terminal spatially bundles these subframes in Step 1 in FIG. 6A (portions enclosed by a solid line in FIG. 6B). As a result of the spatial bundling, ACK, ACK, NACK and ACK are obtained in that order in four DL subframes of the PCell shown in FIG. 6B. Furthermore, in Step2 in FIG. 6A, the terminal applies time-domain bundling to the 4-bit error detection result pattern (ACK, ACK, NACK, ACK) after spatial bundling obtained in Step 1 (portions enclosed by broken line in FIG. 6B). In this way, a 2-bit error detection result of (NACK, ACK) is obtained in the PCell shown in FIG. 6B.

The terminal likewise applies spatial bundling and time-domain bundling also for the SCell shown in FIG. 6B and thereby obtains a 2-bit error detection result (NACK, NACK).

The terminal then combines the error detection result patterns using 2 bits each after time-domain bundling of the PCell and SCell in Step3 in FIG. 6A in order of the PCell, SCell to bundle them into a 4-bit error detection result pattern (NACK, ACK, NACK, NACK). The terminal determines a PUCCH resource (in this case, h1) and a phase point (in this case, -j) using the mapping table shown in Step3 in FIG. 6A from this 4-bit error detection result pattern.

The LTE system and LTE-A system support HARQ (Hybrid Automatic Repeat reQuest) (hereinafter, referred to as "DL HARQ") of downlink data. In DL HARQ, the LTE terminal and LTE-A terminal store an LLR (Log Likelihood Ratio) (or may also be called "soft bit") for downlink data in which an error is detected in a soft buffer. The LLR stored in the soft buffer is combined with an LLR corresponding to downlink data to be retransmitted (retransmission data). The soft buffer (buffer capacity: $N_{soft}$) as shown in FIG. 7A and following equation 1 is divided into equal portions based on the number of downlink component carriers (KO supported by a terminal, the number of multiplexed layers ($K_{MIMO}$) supported by the terminal, and the maximum number of DL HARQ processes ($M_{DL\_HARQ}$) defined in a UL-DL configuration set in the terminal, and an IR (Incremental Redundancy) buffer size ($N_{IR}$) per transport block (or TB) is calculated. The maximum number of DL HARQ processes represents the number of retransmission processes (the number of DL HARQ processes) set based on a maximum value of retransmission interval (may also be called "RTT (Round Trip Time)") after transmission of downlink data in DL HARQ in each UL-DL configuration (Config #0 to #6) until retransmission of the downlink data (see FIG. 7B).

[1]
$$N_{IR} = \left\lfloor \frac{N_{soft}}{K_C \cdot K_{MIMO} \cdot \min(M_{DL\_HARQ}, M_{limit})} \right\rfloor \quad \text{(Equation 1)}$$

The terminal stores the LLR corresponding to the downlink data in which an error has been detected in an IR buffer corresponding to each DL HARQ process within a range of IR buffer size per TB calculated according to equation 1. Here, $M_{limit}$ shown in equation 1 is an allowable value of the number of DL HARQ processes stored in the soft buffer and the value of $M_{limit}$ is, for example, 8. To reduce the total capacity of the soft buffer (soft buffer capacity), the IR buffer per TB cannot always store all systematic bits (LLR) per TB and all parity bits (LLR). Therefore, increasing the IR buffer size per TB as much as possible within the soft buffer capacity leads to an increase in the total amount of LLR that can be stored in the IR buffer and consequently leads to an improvement of HARQ retransmission performance.

As described above, the LTE-A terminal is designed on the assumption that the same UL-DL configuration is set among a plurality of component carriers. This is because conventionally, carrier aggregation (so-called intra-band carrier aggregation) among a plurality of component carriers (e.g., certain component carrier having a 20 MHz bandwidth and another component carrier having a 20 MHz bandwidth within a 2 GHz band) in one frequency band (e.g., 2 GHz band) is assumed. That is, when uplink communication and downlink communication are simultaneously performed between different component carriers within the same frequency band, a terminal in downlink communication receives large interference from a terminal carrying out uplink communication.

On the other hand, in carrier aggregation (so-called inter-band carrier aggregation) between component carriers (e.g., component carrier having a 20 MHz bandwidth in a 2 GHz band and component carrier having a 20 MHz bandwidth in an 800 MHz band) of a plurality of frequency bands (e.g., 2 GHz band and 800 MHz band), there is a large frequency interval between both component carriers.

Thus, a terminal in downlink communication using a component carrier in a certain frequency band (e.g., component carrier having a 20 MHz bandwidth in a 2 GHz band) receives smaller interference from a terminal in uplink communication using another frequency band (e.g., component carrier having a 20 MHz bandwidth in an 800 MHz band).

Incidentally, studies are being carried out, for a case where a communication carrier providing an LTE-A TDD system newly assigns a frequency band to an LTE-A service, on a possibility of varying a UL-DL configuration of the newly assigned frequency band from a UL-DL configuration of an existing frequency band depending on a service to which the communication carrier attaches greater importance. To be more specific, a communication carrier that attaches greater importance to downlink communication throughput uses a UL-DL configuration having a greater ratio of DL subframes to UL subframes in a new frequency band (e.g., Config 3, 4 or 5 or the like in FIG. 3). This allows a more flexible system to be constructed.

To realize a low PAPR (Peak to Average Power Ratio) during carrier aggregation in LTE-A, studies are being carried out on a possibility of a terminal transmitting a response signal (HARQ-ACK) which is an error detection result corresponding to each piece of downlink data of each component carrier (PCell and SCell) always using a single component carrier (e.g., PCell) only.

However, when different UL-DL configurations are set between component carriers, there are timings at which subframes of PCell become DL subframes and subframes of SCell become UL subframes. At such timings, the terminal cannot transmit any response signal in response to downlink data of SCell using PUCCH of PCell. Thus, in LTE-A, studies are being carried out on a possibility of using PDSCH-PUCCH timing defined in another UL-DL configuration (reference UL-DL configuration) instead of transmission/reception timing (PDSCH-PUCCH timing) between PDSCH (downlink data reception) and PUCCH (response signal transmission) defined in the UL-DL configuration set in SCell.

As shown in FIG. 8, there are inclusion relations regarding DL subframes between the UL-DL configurations shown in FIG. 3. A relation between Config #0 and Config #1 will be described as an example first. In FIG. 3, DL subframes (including special subframes) included in one frame are SF #0, #1, #5 and #6 in Config #0 and SF #0, #1, #4, #5, #6 and #9 in Config #1. That is, a set of DL subframes included in one frame of Config #1 includes a set of DL subframes included in one frame of Config #0. That is, the set of DL subframes of Config #1 can be said to be a superset of DL subframes of Config #0. Alternatively, the set of DL subframes of Config #0 can also be said to be a subset of DL subframes of Config #1. In the following description, in Config #1, for example, in such a combination of UL-DL configurations in which DL subframes are set at least at the same timings as those of DL subframes of Config #0, Config #1 may be expressed as "DL heavier" than Config #0. Furthermore, the set of UL subframes of Config #0 may also be said to include the set of UL subframes of Config #1 (superset of UL subframes) (not shown). Therefore, in the following description, for example, in such a combination of UL-DL configurations in which UL subframes are set at the same timings as those of UL subframes of Config #1 at least, Config #0 may also be expressed as "UL heavier" than Config #1.

Next, a relationship between Config #1 and Config #3 will be described. In FIG. 3, DL subframes (including special subframes) included in one frame are SF #0, #1 and #5 to #9 in Config #3. That is, there is mutually no inclusion relation between sets of DL subframes of Config #1 and Config #3. That is, the set of DL subframes of Config #1 can be said to be neither superset nor subset of DL subframes of Config #3. In the following description, in a combination of UL-DL configurations in which DL subframes and UL subframes set at different timings are set in Config #1 and Config #3 at least, Config #1 may be expressed as neither "DL heavy nor UL heavy" with respect to Config #3. Inclusion relations regarding DL subframes similar to those described above also exist between other UL-DL configurations (see FIG. 8).

FIGS. 9A and 9B illustrate an example of PDSCH-PUCCH timings when a set of DL subframes of PCell included in one frame includes a set of DL subframes of SCell (that is, when the set of DL subframe of PCell is a superset of DL subframes of SCell or a UL-DL configuration of PCell is DL heavier than a UL-DL configuration of SCell). In FIG. 9A and FIG. 9B, Config #1 is set in PCell and Config #0 is set in SCell.

Hereinafter, a case where the UL-DL configuration of PCell is DL heavier than the UL-DL configuration of SCell may be expressed as "PCell is DL heavy."

FIG. 9A illustrates a case where SCell references PDSCH-PUCCH timing defined in Config #0 set in SCell. In this case, in Config #0 set in SCell, despite the UL subframe in which PUCCH (response signal) corresponding to PDSCH (downlink data) is transmitted, there are timings at which subframes become DL subframes in Config #1 set in PCell (subframes #4 and #9 in FIG. 9A). PUCCH transmission in PCell corresponding to PDSCH of SCell cannot be performed at this timing. Therefore, it is not possible to use any DL subframe of SCell (subframes #0 and #5 in FIG. 9A) corresponding to this timing to indicate PDSCH.

On the other hand, FIG. 9B illustrates a case where SCell references PDSCH-PUCCH timing defined in Config #1 set in PCell. In this case, subframes of PCell never become DL subframes at timings at which PUCCH (response signal) corresponding to PDSCH (downlink data) of SCell is transmitted. Therefore, PUCCH transmission in PCell corresponding to PDSCH in SCell can always be performed. Therefore, all DL subframes in SCell can be used to indicate PDSCH. Thus, in FIG. 9B, since there is no timing at which PUCCH transmission in PCell corresponding to PDSCH of SCell cannot be performed in PCell, all DL subframes in SCell can be used.

Next, FIGS. 10A and 10B each illustrate an example of PDSCH-PUCCH timing in a case where a set of DL subframes of PCell included in one frame includes no set of DL subframes of SCell and is not included in the set of DL subframes of SCell (that is, when the set of DL subframes of PCell is neither superset nor subset of DL subframes of SCell or PCell is neither DL heavy nor UL heavy). In FIG. 10A and FIG. 10B, Config #1 is set in PCell and Config #3 is set in SCell.

FIG. 10A illustrates a case where SCell references PDSCH-PUCCH timings defined in Config #1 set in PCell. In this case, as in the case of FIG. 9B, subframes of PCell never become DL subframes at timings at which PUCCH corresponding to PDSCH of SCell is transmitted. Thus, in FIG. 10A, there is no DL subframe of SCell that can no longer be used due to inability for PCell to transmit PUCCH corresponding to PDSCH of SCell. However, there are cases where DL subframes of SCell cannot be used because PDSCH-PUCCH timings are not defined in Config #1 set in PCell. For example, while subframes #7 and #8 shown in FIG. 10A are DL subframes in SCell, they are UL subframes in PCell. Thus, PDSCH-PUCCH timings at which subframes #7 and #8 become DL subframes are not originally defined in Config #1 set in PCell. For this reason, DL subframes of SCell cannot be used to indicate PDSCH in subframes #7 and 8.

In contrast, FIG. 10B illustrates a case where SCell references PDSCH-PUCCH timings defined in a UL-DL configuration (Config #4) having a maximum number of DL subframes among UL-DL configurations which are supersets of DL subframes of both Config #1 set in PCell and Config #3 set in SCell.

There are three combinations of UL-DL configurations in which two component carriers are neither DL heavy nor UL heavy: Config #1 and Config #3, Config #2 and Config #3, and Config #2 and Config #4 (see FIG. 8). At this time, when one component carrier is Config #1 and the other component carrier is Config #3 (see FIG. 10B), a UL-DL configuration referenced by SCell is assumed to be Config #4. Furthermore, when one component carrier is Config #2 and the other component carrier is Config #3, a UL-DL configuration referenced by SCell is assumed to be Config #5. On the other hand, when one component carrier is Config #2 and the other component carrier is Config #4, a UL-DL configuration referenced by SCell is assumed to be Config #5.

By so doing, there is no timing in PCell at which PUCCH corresponding to PDSCH of SCell cannot be transmitted. Furthermore, there will be no case where DL subframes of SCell cannot be used due to inability for PCell to define the PDSCH-PUCCH timings described above. For this reason, SCell can use all DL subframes.

FIG. 11 illustrates an example of PDSCH-PUCCH timings when a set of DL subframes of PCell included in one frame is included in a set of DL subframes of SCell (that is, when a set of DL subframes of PCell is a subset of DL subframes of SCell or when PCell is UL heavy). In this case, SCell references PDSCH-PUCCH timings defined in Config #1 set in SCell, and can thereby use all DL subframes of SCell.

In the LTE-A system, studies are being carried out on a possibility of changing UL-DL configurations (hereinafter may be referred to as "TDD eIMTA (enhancement for DL-UL Interference Management and Traffic Adaptation)." Examples of objects of TDD eIMTA include provision of a service that meets the needs of users by a flexible change of a UL/DL ratio, a reduction of power consumption in a base station by increasing a UL ratio in a time zone with a low traffic load or the like. As a method of changing a UL-DL configuration, studies are being carried out on (1) a method by indicating an SI (System Information) signaling base, (2) a method by indicating an RRC (higher layer) signaling base and (3) a method by indicating an L1 (Physical Layer) signaling base.

Method (1) corresponds to a change of a UL-DL configuration with the lowest frequency. Method (1) is suitable for cases where an objective is to reduce power consumption in a base station by increasing a UL ratio, for example, in a time zone with a low traffic load (e.g., midnight or early morning). Method (3) corresponds to a change of a UL-DL configuration with the highest frequency. A small cell such as a pico cell has fewer terminals to be connected than a large cell such as a macro cell. In a pico cell, UL/DL traffic of the entire pico cell is determined depending on the amount of UL/DL traffic in a small number of terminals connected to the pico cell. For this reason, a violent time fluctuation in UL/DL traffic occurs in the pico cell. Therefore, method (3) is suitable for a case where a UL-DL configuration is changed in accordance with a time fluctuation in UL/DL traffic in a small cell like a pico cell. Method (2) may be positioned between method (1) and method (3) and is suitable for a case where a UL-DL configuration is changed with a medium degree of frequency.

CITATION LIST

Non-Patent Literature

NPL 1
3GPP TS 36.211 V10.1.0, "Physical Channels and Modulation (Release 10)," March 2011
NPL 2
3GPP TS 36.212 V10.1.0, "Multiplexing and channel coding (Release 10)," March 2011
NPL 3
3GPP TS 36.213 V10.1.0, "Physical layer procedures (Release 10)," March 2011
NPL 4
Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April. 2009
NPL 5
Ericsson and ST-Ericsson, "A/N transmission in the uplink for carrier aggregation," R1-100909, 3GPP TSG-RAN WG1 #60, February 2010
NPL 6
ZTE, 3GPP RAN1 meeting #57, R1-091702, "Uplink Control Channel Design for LTE-Advanced," May 2009
NPL 7
Panasonic, 3GPP RAN1 meeting #57, R1-091744, "UL ACK/NACK transmission on PUCCH for Carrier aggregation," May 2009

BRIEF SUMMARY

Technical Problem

As described above, DL HARQ regarding downlink data needs to be supported even when a UL-DL configuration varies among a plurality of component carriers. As an example, FIG. 12A shows a DL HARQ process when a base station assigns downlink data to a terminal so that the maximum number of DL HARQ processes is taken. FIG. 12A illustrates a case where PCell is DL heavy as shown in FIG. 9B and a case where SCell references PDSCH-PUCCH timings defined in a UL-DL configuration set in PCell. Furthermore, for a comparison with FIG. 12A, FIG. 13A shows an example of DL HARQ processes in a case where a base station assigns downlink data to a terminal so as to take the maximum number of DL HARQ processes in a component carrier (cell) in which Config #0 is set when carrier aggregation is not set (non-CA period).

Note that encircled numbers in FIG. 12A and FIG. 13A show DL HARQ process numbers. On the other hand, solid line arrows show PDSCH-PUCCH timings. Broken line arrows show timings between reception of PUCCH (response signal) at a base station and retransmission of PDSCH (downlink data) for the PUCCH (hereinafter, may also be referred to as "PUCCH-PDSCH timing"). Note that PDSCH-PUCCH timing and PUCCH-PDSCH timing may be expressed as DL HARQ timing. For example, a time interval required from PUCCH reception to PDSCH retransmission is 4 ms (4 subframes) or more. Furthermore, the time required from PDSCH transmission to PDSCH retransmission is expressed as PDSCH RTT (round trip time).

Both SCell in which Config #0 is set in FIG. 12A and a component carrier in which Config #0 is set in FIG. 13A have four DL subframes (including special subframes) per frame. However, PDSCH RTT in FIG. 12A is different from that in FIG. 13A. To be more specific, PDSCH RTT is 10 ms for all DL HARQ processes in FIG. 13A. In contrast, PDSCH RTT of each DL HARQ process is 11 ms or 14 ms in FIG. 12A. For this reason, in FIG. 13A, since PDSCH RTT is 10 ms for four DL subframes per frame (10 ms), a maximum of four DL HARQ processes are sufficient. This corresponds to the fact in FIG. 7B that the maximum number of DL HARQ processes in Config #0 is four. On the other hand, since PDSCH RTT in FIG. 12A is greater than 10 ms, more than four DL HARQ processes are necessary. To be more specific, in the case of FIG. 12A, a maximum of five DL HARQ processes are necessary.

The reason that more DL HARQ processes are necessary is that SCell references PDSCH-PUCCH timings defined in a UL-DL configuration which is DL heavier than a UL-DL configuration set in SCell itself. In other words, this is because SCell references PDSCH-PUCCH timings defined in the UL-DL configuration which has fewer UL subframes and fewer chances of PUCCH transmission than the UL-DL configuration set in SCell.

As shown in FIG. 7A and FIG. 7B, a DL HARQ soft buffer is divided based on the maximum number of DL HARQ processes ($M_{DL\_HARQ}$) defined in the UL-DL configuration set in the terminal (see equation 1). For example, FIG. 13B illustrates the SCell soft buffer in FIG. 13A. As shown in FIG. 13B, when the UL-DL configuration set in SCell is Config #0 and the maximum number of DL HARQ processes of SCell is four, the SCell soft buffer is divided into four.

On the other hand, FIG. 12B illustrates the SCell soft buffer in FIG. 12A. As shown in FIG. 12B, since the UL-DL configuration set in SCell is Config #0, the SCell soft buffer is divided into four as in the case of FIG. 13B. However, as shown in FIG. 12A, when SCell references PDSCH-PUCCH timings defined in a UL-DL configuration which is DL heavier than the UL-DL configuration set in SCell, the maximum number of DL HARQ processes in SCell is greater than the value shown in FIG. 7B (value during a non-CA period). To be more specific, when PDSCH-PUCCH timing referenced by SCell is timing of Config #1, the maximum number of DL HARQ processes actually required in SCell is five. For this reason, as shown in FIG. 12B, the terminal cannot allocate any IR buffer to some DL HARQ processes (DL HARQ process number 5 in FIG. 13B). Thus, it is not possible to obtain any coding gain by HARQ retransmission for the DL HARQ processes to which no IR buffer is allocated.

As described above, it is when SCell references PDSCH-PUCCH timings defined in a UL-DL configuration which is DL heavier than the UL-DL configuration set in SCell that the maximum number of DL HARQ processes which is actually required in SCell becomes greater than the maximum number of DL HARQ processes defined in the UL-DL configuration set in SCell. Therefore, not only when PCell is DL heavy but also when PCell is neither DL heavy nor UL heavy (FIG. 10B), the maximum number of DL HARQ processes which is actually required in SCell becomes greater than the maximum number of DL HARQ processes defined in the UL-DL configuration set in SCell. Thus, problems similar to those described above exist also when PCell is neither DL heavy nor UL heavy.

As described above, when SCell references PDSCH-PUCCH timings defined in a UL-DL configuration which is DL heavier than the UL-DL configuration set in SCell, there is a case where the IR buffer is not allocated to some DL HARQ processes and it is not possible to obtain any coding gain through HARQ retransmission.

An object of the present invention is to provide a terminal apparatus and a buffer dividing method capable of obtaining a coding gain by HARQ for all DL HARQ processes even when a UL-DL configuration differs among a plurality of component carriers.

Solution to Problem

A terminal apparatus according to an aspect of the present invention is an apparatus which communicates with a base station apparatus using a plurality of component carriers and for which a configuration pattern of subframes included in one frame is set for each of the plurality of component carriers, the configuration pattern including a downlink communication subframe used for downlink communication and an uplink communication subframe used for uplink communication, the terminal apparatus including: a decoding section that stores, in a retransmission buffer, downlink data transmitted in each of the plurality of component carriers and decodes the downlink data; a generating section that generates a response signal using a result of error detection of the downlink data; and a transmitting section that transmits, using a first component carrier of the plurality of component carriers, a response signal for first downlink data received using the first component carrier and a response signal for second downlink data received using a second component carrier of the plurality of component carriers, in which: the buffer includes a first buffer that stores the first downlink data and a second buffer that stores the second downlink data; and the second buffer is divided into regions respectively corresponding to retransmission processes based on a specific value determined by a combination of a first configuration pattern that is set in the first component carrier and a second configuration pattern that is set in the second component carrier.

A buffer dividing method according to an aspect of the present invention is a method for a terminal apparatus which communicates with a base station apparatus, using a plurality of component carriers and in which a configuration pattern of subframes included in one frame is set for each of the plurality of component carriers, the configuration pattern including a downlink communication subframe used for downlink communication and an uplink communication subframe used for uplink communication, the method including: storing, in a retransmission buffer, downlink data transmitted in each of the plurality of component carriers; decoding the downlink data; generating a response signal using a result of error detection of the downlink data; and transmitting, using a first component carrier of the plurality of component carriers, a response signal for first downlink data received in the first component carrier and a response signal for second downlink data received in a second component carrier of the plurality of component carriers, in which: the buffer includes a first buffer that stores the first downlink data and a second buffer that stores the second downlink data; and the second buffer is divided into regions respectively corresponding to retransmission processes based on a specific value determined by a combination of a first configuration pattern that is set in the first component carrier and a second configuration pattern that is set in the second component carrier.

Advantageous Effects of Invention

According to the present invention, it is possible to obtain a coding gain by HARQ for all DL HARQ processes even when a UL-DL configuration differs among a plurality of component carriers.

BRIEF DESCRIPTION OF THE SEVERAL VIEWS OF THE DRAWINGS

FIGS. 10A and 10B are diagrams provided for describing SCell reference timings when PCell is neither DL heavy nor UL heavy;

FIGS. 17A to 17C are diagrams provided for describing a setting range of the maximum number of DL HARQ processes referenced by SCell according to Embodiment 1 of the present invention;

FIG. 18 is a diagram illustrating PDSCH RTT corresponding to a UL-DL configuration according to Embodiment 1 of the present invention;

FIGS. 19A and 19B are diagrams illustrating the maximum number of DL HARQ processes referenced by SCell according to Embodiment 1 of the present invention;

FIG. 21 is a diagram illustrating results of comparison in minimum values between the maximum number of DL HARQ processes referenced by SCell and a constraint value of the maximum number of DL HARQ processes according to Embodiment 1 of the present invention;

FIGS. 27A and 27B are diagrams provided for describing a method of determining the maximum number of DL HARQ processes referenced by SCell when TDD eIMTA is set according to Embodiment 4 of the present invention.

DETAILED DESCRIPTION

Figure 1:
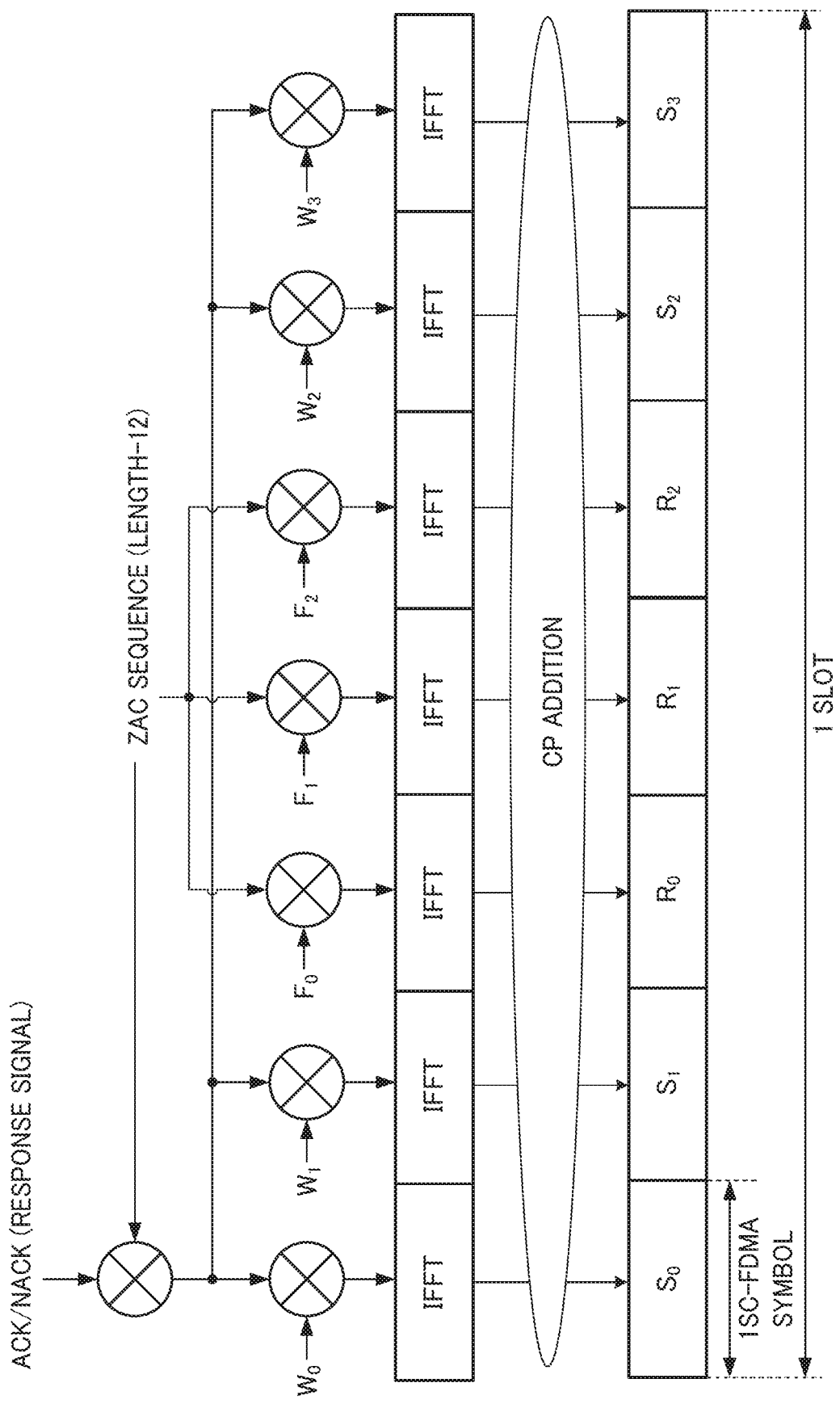
FIG. 1 is a diagram illustrating a method of spreading response signals and reference signals.
Figure 2:
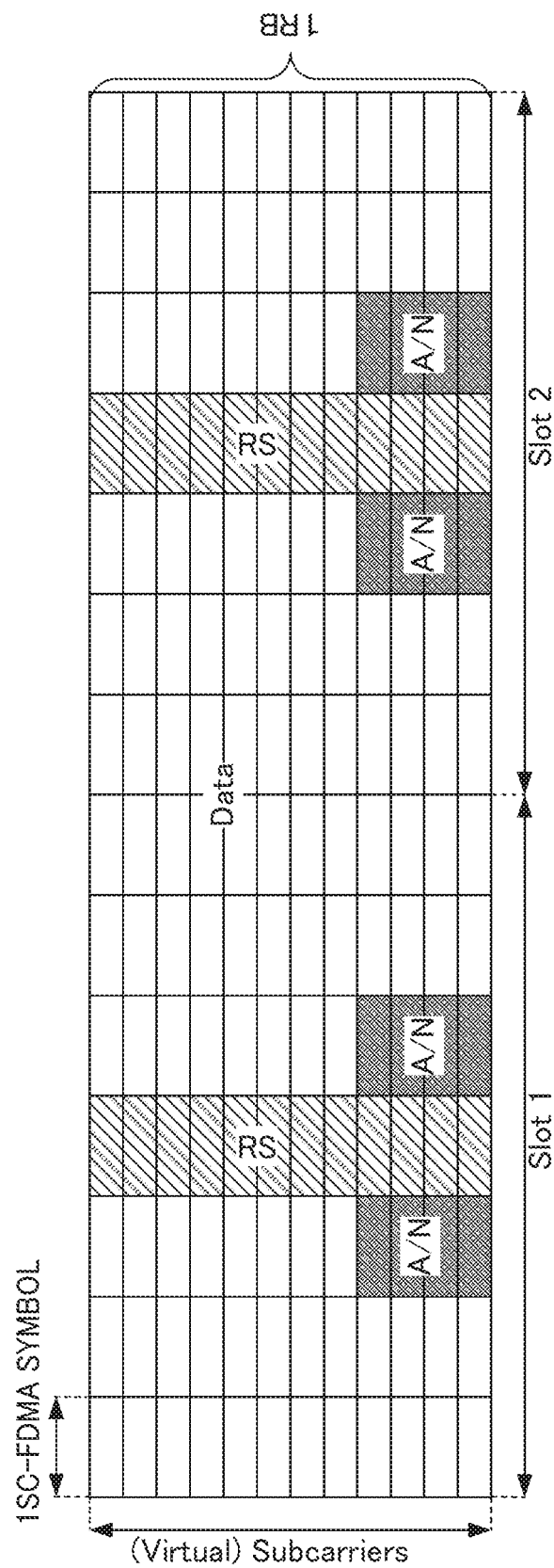
FIG. 2 is a diagram illustrating an operation related to a case where TDM is applied to response signals and uplink data on PUSCH resources.
Figure 3:
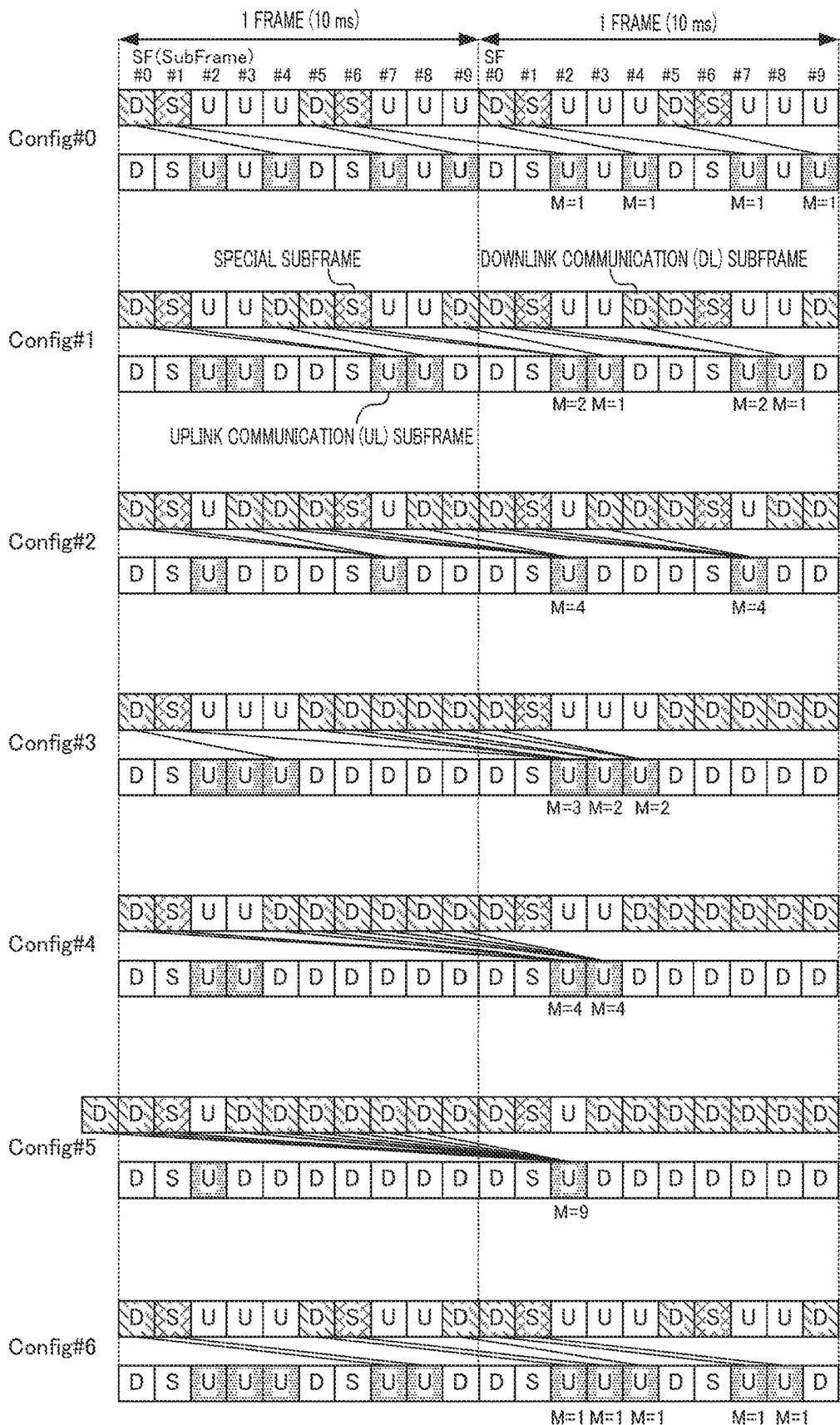
FIG. 3 is a diagram provided for describing a UL-DL configuration in TDD.
Figures 4A, 4B:
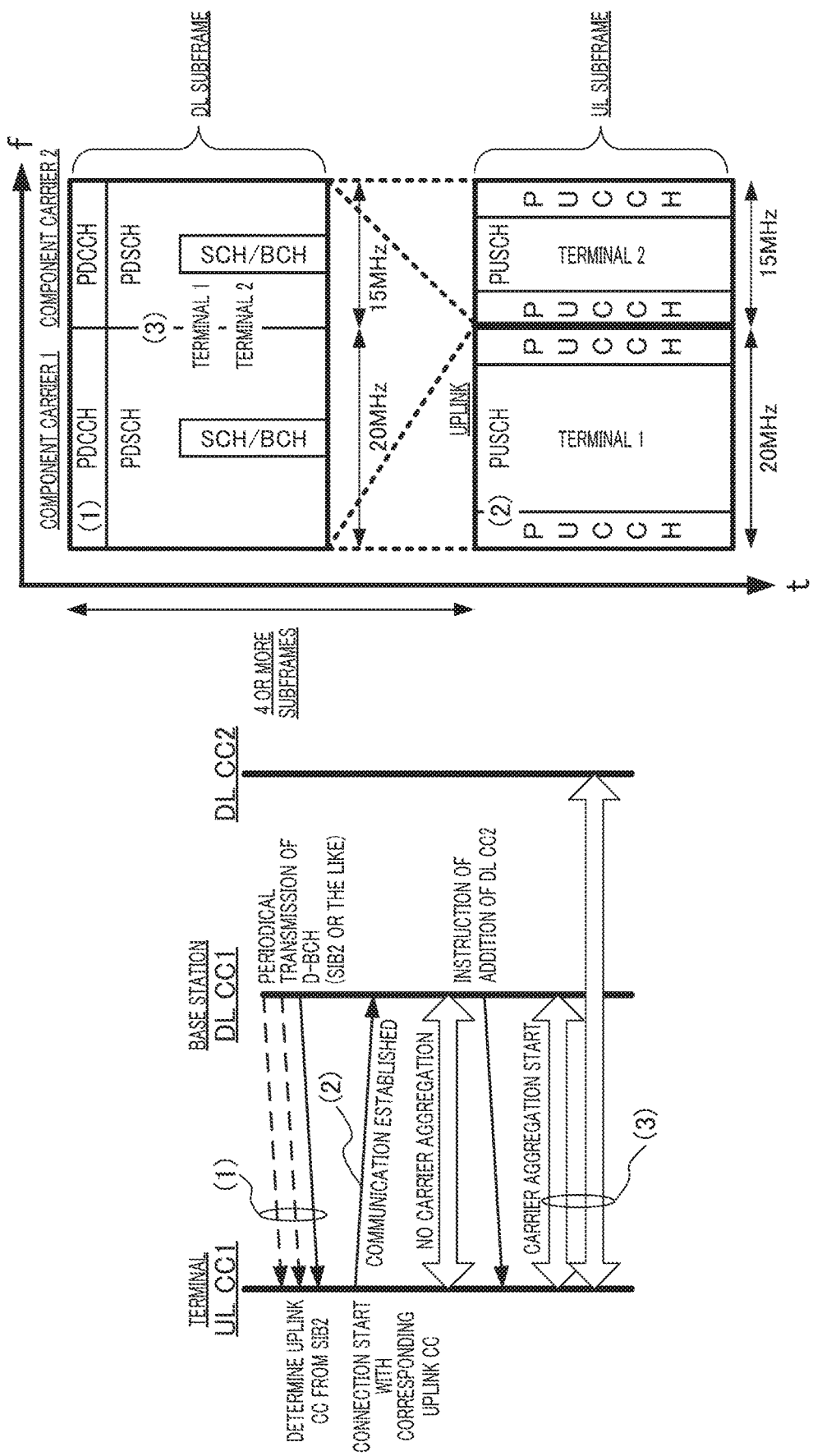
FIGS. 4A and 4B are diagrams provided for describing asymmetric carrier aggregation and a control sequence applied to individual terminals.
Figure 5:
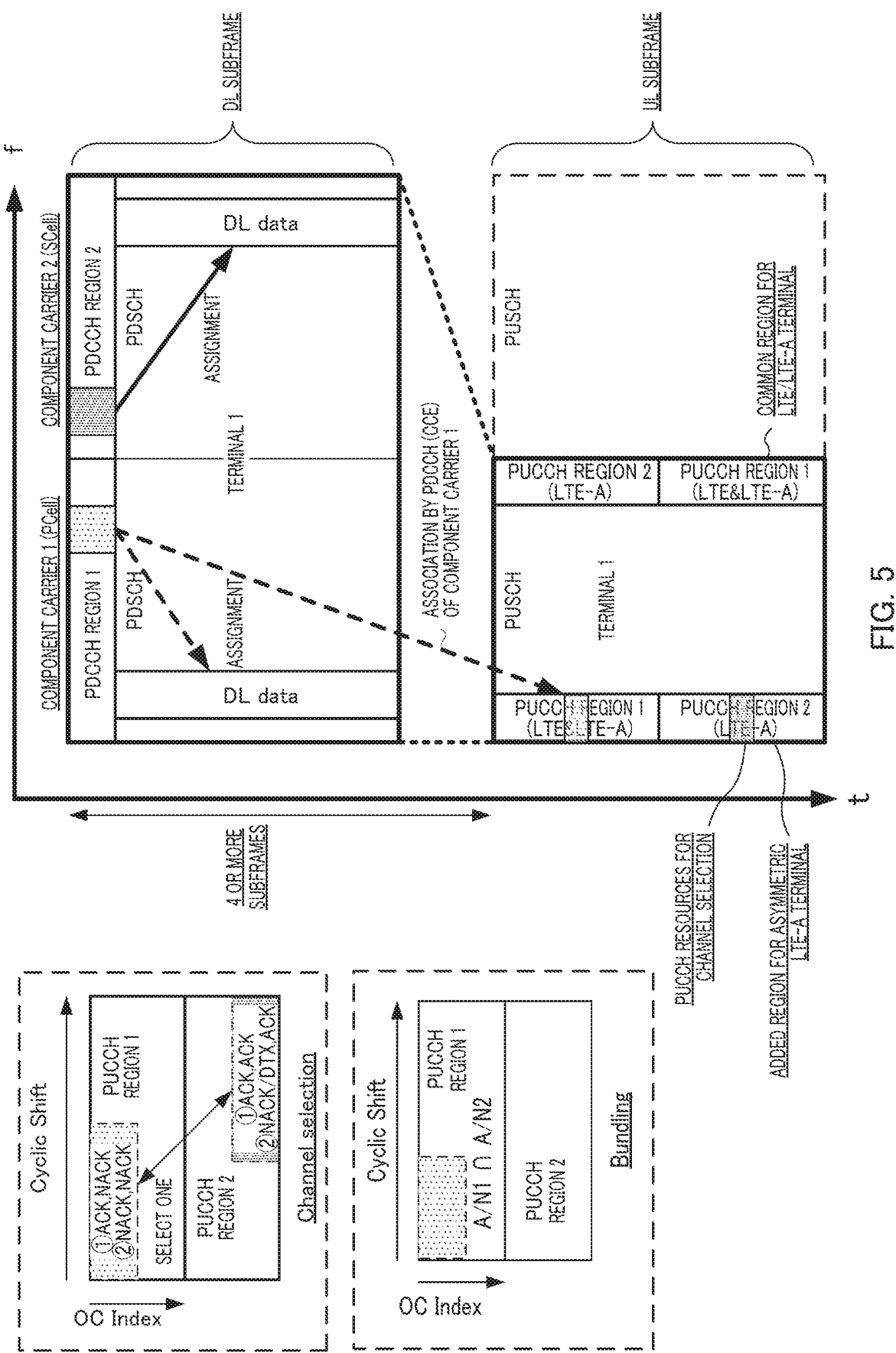
FIG. 5 is a diagram provided for describing channel selection.
Figure 6B:
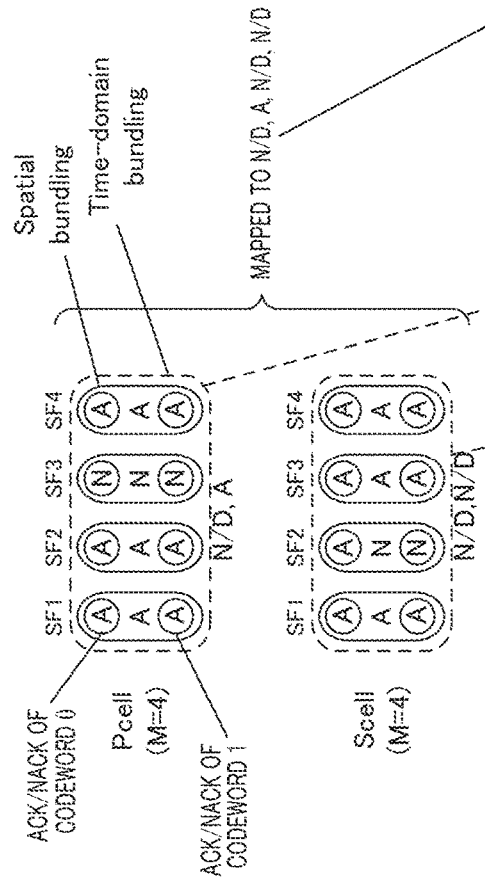
FIGS. 6A and 6B are diagrams provided for describing a bundling method and a mapping method in TDD.
Figure 6A:
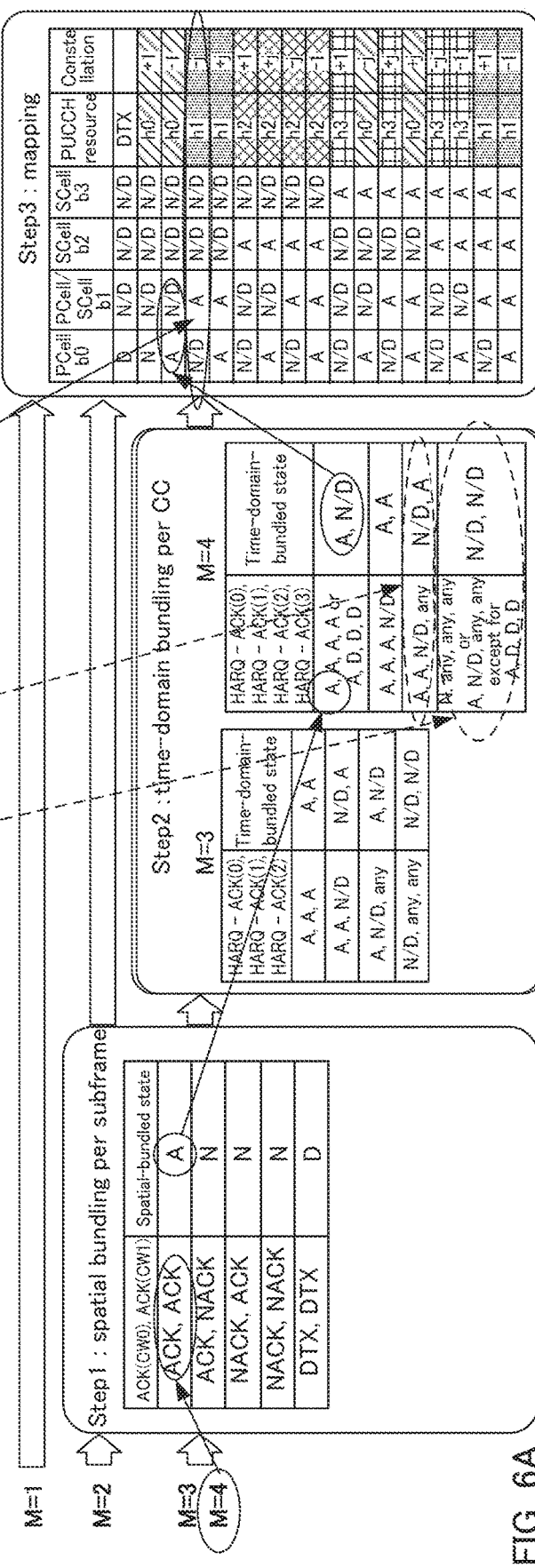

Hereinafter, embodiments of the present invention will be described in detail with reference to the accompanying drawings. Throughout the embodiments, the same elements are assigned the same reference numerals and any duplicate description of the elements is omitted.

(Embodiment 1)

Figure 14:
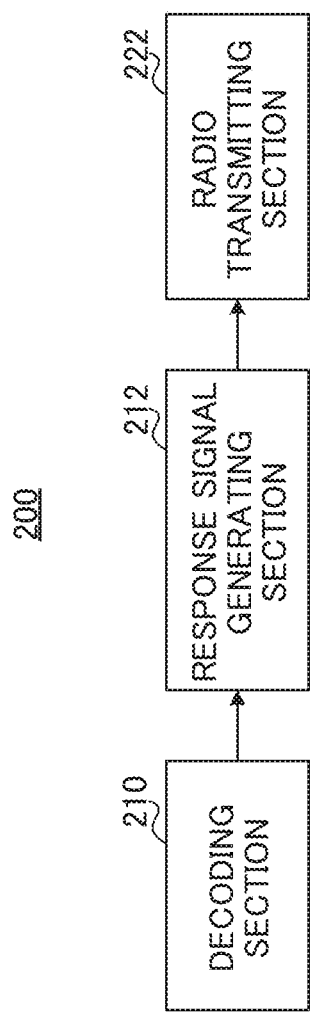
FIG. 14 is a block diagram illustrating a main configuration of a terminal according to Embodiment 1 of the present invention.

FIG. 14 is a main configuration diagram of terminal 200 according to the present embodiment. Terminal 200 communicates with base station 100 using a plurality of component carriers. Furthermore, as a configuration pattern of subframes included in one frame, the configuration pattern including downlink communication subframes (DL subframes) used for downlink communication and uplink communication subframes (UL subframes) used for uplink communication (UL-DL Configuration) is set in each component carrier set for terminal 200. In terminal 200, decoding section 210 stores downlink data respectively transmitted in a plurality of component carriers in a retransmission buffer (soft buffer) and decodes the downlink data, response signal generating section 212 generates a response signal using results of error detection of the downlink data, radio transmitting section 222 transmits a response signal corresponding to first downlink data received in a first component carrier (PCell) of the plurality of component carriers and a response signal corresponding to second downlink data received in a second component carrier (PCell) using the first component carrier. Here, the above-described soft buffer includes a first buffer (PCell soft buffer) that stores first downlink data and a second buffer (SCell soft buffer) that stores second downlink data, and the second buffer is divided into regions respectively corresponding to retransmission processes (IR buffers) based on a specific value (maximum UL-DL configuration to be referenced) determined by a combination of a first configuration pattern set in the first component carrier and a second configuration pattern set in the second component carrier.

(Configuration of Base Station)

Figure 15:
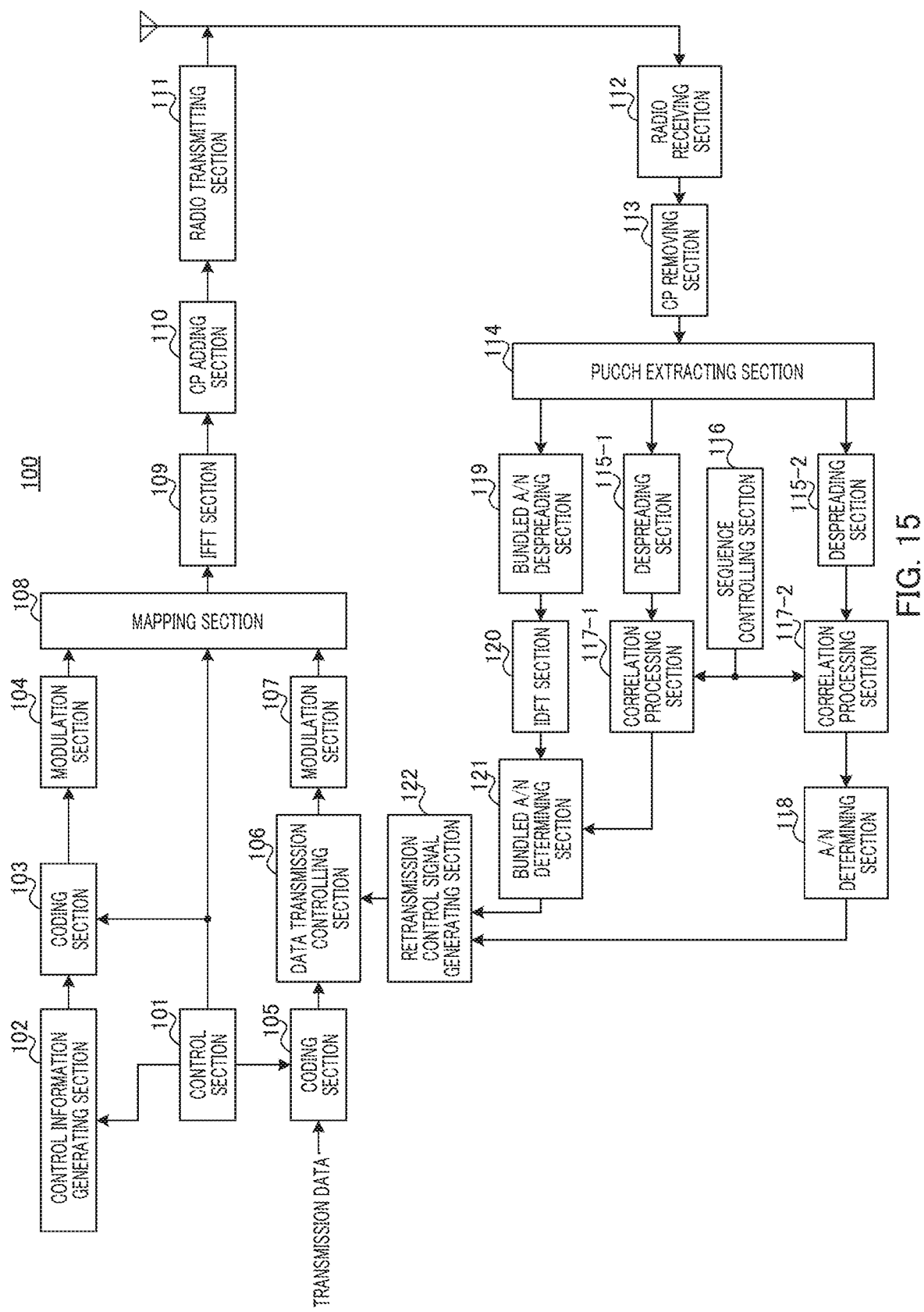
FIG. 15 is a block diagram illustrating a configuration of a base station according to Embodiment 1 of the present invention.

FIG. 15 is a configuration diagram of base station 100 according to Embodiment 1 of the present invention. In FIG. 15, base station 100 includes control section 101, control information generating section 102, coding section 103, modulation section 104, coding section 105, data transmission controlling section 106, modulation section 107, mapping section 108, inverse fast Fourier transform (IFFT) section 109, CP adding section 110, radio transmitting section 111, radio receiving section 112, CP removing section 113, PUCCH extracting section 114, despreading section 115, sequence controlling section 116, correlation processing section 117, A/N determining section 118, bundled A/N despreading section 119, inverse discrete Fourier transform (IDFT) section 120, bundled A/N determining section 121 and retransmission control signal generating section 122.

Control section 101 assigns a downlink resource for transmitting control information (i.e., downlink control information assignment resource) and a downlink resource for transmitting downlink data (i.e., downlink data assignment resource) for a resource assignment target terminal (hereinafter, referred to as "destination terminal" or simply "terminal") 200. This resource assignment is performed in a downlink component carrier included in a component carrier group configured for resource assignment target terminal 200. In addition, the downlink control information assignment resource is selected from among the resources corresponding to downlink control channel (i.e., PDCCH) in each downlink component carrier. Moreover, the downlink data assignment resource is selected from among the resources corresponding to downlink data channel (i.e., PDSCH) in each downlink component carrier. In addition, when there are a plurality of resource assignment target terminals 200, control section 101 assigns different resources to resource assignment target terminals 200, respectively.

The downlink control information assignment resources are equivalent to L1/L2CCH described above. To put it more specifically, the downlink control information assignment resources are each formed of one or a plurality of CCEs.

Control section 101 determines the coding rate used for transmitting control information to resource assignment target terminal 200. The data size of the control information varies depending on the coding rate. Thus, control section 101 assigns a downlink control information assignment resource having the number of CCEs that allows the control information having this data size to be mapped to the resource.

Control section 101 outputs information on the downlink data assignment resource to control information generating section 102. Moreover, control section 101 outputs information on the coding rate to coding section 103. In addition, control section 101 determines and outputs the coding rate of transmission data (i.e., downlink data) to coding section 105. Moreover, control section 101 outputs information on the downlink data assignment resource and downlink control information assignment resource to mapping section 108. However, control section 101 controls the assignment in such a way that the downlink data and downlink control information for the downlink data are mapped to the same downlink component carrier.

Control information generating section 102 generates and outputs control information including the information on the downlink data assignment resource to coding section 103. This control information is generated for each downlink component carrier. In addition, when there are a plurality of resource assignment target terminals 200, the control information includes the terminal ID of each destination terminal 200 in order to distinguish resource assignment target terminals 200 from one another. For example, the control information includes CRC bits masked by the terminal ID of destination terminal 200. This control information may be referred to as "control information carrying downlink assignment" or "downlink control information (DCI)." Control information generating section 102 references, for example, the retransmission control signal (not shown) generated by retransmission control signal generating section 122 and includes, in the control information, retransmission information indicating whether transmission of downlink data whose transmission is controlled by data transmission controlling section 106 is initial transmission or retransmission.

Coding section 103 encodes the control information using the coding rate received from control section 101 and outputs the coded control information to modulation section 104.

Modulation section 104 modulates the coded control information and outputs the resultant modulation signals to mapping section 108.

Coding section 105 uses the transmission data (i.e., downlink data) for each destination terminal 200 and the coding rate information from control section 101 as input and encodes and outputs the transmission data to data transmission controlling section 106.

However, when a plurality of downlink component carriers are assigned to destination terminal 200, coding section 105 encodes each piece of transmission data to be transmitted on a corresponding one of the downlink component carriers and transmits the coded pieces of transmission data to data transmission controlling section 106.

Data transmission controlling section 106 outputs the coded transmission data to modulation section 107 and also keeps the coded transmission data at the initial transmission. In addition, data transmission controlling section 106 keeps the transmission data for one destination terminal 200 for each downlink component carrier on which the transmission data is transmitted. Thus, it is possible to perform not only retransmission control for overall data transmitted to destination terminal 200, but also retransmission control for data on each downlink component carrier.

Furthermore, upon reception of a NACK or DTX for downlink data transmitted on a certain downlink component carrier from retransmission control signal generating section 122, data transmission controlling section 106 outputs the data kept in the manner described above and corresponding to this downlink component carrier to modulation section 107. Upon reception of an ACK for the downlink data transmitted on a certain downlink component carrier from retransmission control signal generating section 122, data transmission controlling section 106 deletes the data kept in the manner described above and corresponding to this downlink component carrier.

Modulation section 107 modulates the coded transmission data received from data transmission controlling section 106 and outputs the resultant modulation signals to mapping section 108.

Mapping section 108 maps the modulation signals of the control information received from modulation section 104 to the resource indicated by the downlink control information assignment resource received from control section 101 and outputs the resultant modulation signals to IFFT section 109.

Mapping section 108 maps the modulation signals of the transmission data received from modulation section 107 to the resource (i.e., PDSCH (i.e., downlink data channel)) indicated by the downlink data assignment resource received from control section 101 (i.e., information included in the control information) and outputs the resultant modulation signals to IFFT section 109.

The control information and transmission data mapped to a plurality of subcarriers in a plurality of downlink component carriers in mapping section 108 is transformed into time-domain signals from frequency-domain signals in IFFT section 109, and CP adding section 110 adds a CP to the time-domain signals to form OFDM signals. The OFDM signals undergo transmission processing such as digital to analog (D/A) conversion, amplification and up-conversion and/or the like in radio transmitting section 111 and are transmitted to terminal 200 via an antenna.

Radio receiving section 112 receives, via an antenna, the uplink response signals or reference signals transmitted from terminal 200, and performs reception processing such as down-conversion, A/D conversion and/or the like on the uplink response signals or reference signals.

CP removing section 113 removes the CP added to the uplink response signals or reference signals from the uplink response signals or reference signals that have undergone the reception processing.

PUCCH extracting section 114 extracts, from the PUCCH signals included in the received signals, the signals in the PUCCH region corresponding to the bundled ACK/NACK resource previously indicated to terminal 200. The bundled ACK/NACK resource herein refers to a resource used for transmission of the bundled ACK/NACK signals and adopting the DFT-S-OFDM format structure. To put it more specifically, PUCCH extracting section 114 extracts the data part of the PUCCH region corresponding to the bundled ACK/NACK resource (i.e., SC-FDMA symbols on which the bundled ACK/NACK resource is assigned) and the reference signal part of the PUCCH region (i.e., SC-FDMA symbols on which the reference signals for demodulating the bundled ACK/NACK signals are assigned). PUCCH extracting section 114 outputs the extracted data part to bundled A/N despreading section 119 and outputs the reference signal part to despreading section 115-1.

In addition, PUCCH extracting section 114 extracts, from the PUCCH signals included in the received signals, a plurality of PUCCH regions corresponding to an A/N resource associated with a CCE that has been occupied by the PDCCH used for transmission of the downlink assignment control information (DCI), and corresponding to a plurality of A/N resources previously indicated to terminal 200. The A/N resource herein refers to the resource to be used for transmission of an A/N. To put it more specifically, PUCCH extracting section 114 extracts the data part of the PUCCH region corresponding to the A/N resource (i.e., SC-FDMA symbols on which the uplink control signals are assigned) and the reference signal part of the PUCCH region (i.e., SC-FDMA symbols on which the reference signals for demodulating the uplink control signals are assigned). PUCCH extracting section 114 outputs both of the extracted data part and reference signal part to despreading section 115-2. In this manner, the response signals are received on the resource selected from the PUCCH resource associated with the CCE and the specific PUCCH resource previously indicated to terminal 200.

Sequence controlling section 116 generates a base sequence that may be used for spreading each of the A/N indicated from terminal 200, the reference signals for the A/N, and the reference signals for the bundled ACK/NACK signals (i.e., length-12 ZAC sequence). In addition, sequence controlling section 116 identifies a correlation window corresponding to a resource on which the reference signals may be assigned (hereinafter, referred to as "reference signal resource") in PUCCH resources that may be used by terminal 200. Sequence controlling section 116 outputs the information indicating the correlation window corresponding to the reference signal resource on which the reference signals may be assigned in bundled ACK/NACK resources and the base sequence to correlation processing section 117-1. Sequence controlling section 116 outputs the information indicating the correlation window corresponding to the reference signal resource and the base sequence to correlation processing section 117-1. In addition, sequence controlling section 116 outputs the information indicating the correlation window corresponding to the A/N resources on which an A/N and the reference signals for the A/N are assigned and the base sequence to correlation processing section 117-2.

Despreading section 115-1 and correlation processing section 117-1 perform processing on the reference signals extracted from the PUCCH region corresponding to the bundled ACK/NACK resource.

To put it more specifically, despreading section 115-1 despreads the reference signal part using a Walsh sequence to be used in secondary-spreading for the reference signals of the bundled ACK/NACK resource by terminal 200 and outputs the despread signals to correlation processing section 117-1.

Correlation processing section 117-1 uses the information indicating the correlation window corresponding to the reference signal resource and the base sequence and thereby finds a correlation value between the signals received from despreading section 115-1 and the base sequence that may be used in primary-spreading in terminal 200. Correlation processing section 117-1 outputs the correlation value to bundled A/N determining section 121.

Despreading section 115-2 and correlation processing section 117-2 perform processing on the reference signals and A/Ns extracted from the plurality of PUCCH regions corresponding to the plurality of A/N resources.

To put it more specifically, despreading section 115-2 despreads the data part and reference signal part using a Walsh sequence and a DFT sequence to be used in secondary-spreading for the data part and reference signal part of each of the A/N resources by terminal 200, and outputs the despread signals to correlation processing section 117-2.

Correlation processing section 117-2 uses the information indicating the correlation window corresponding to each of the A/N resources and the base sequence and thereby finds a correlation value between the signals received from despreading section 115-2 and a base sequence that may be used in primary-spreading by terminal 200. Correlation processing section 117-2 outputs each correlation value to A/N determining section 118.

A/N determining section 118 determines, on the basis of the plurality of correlation values received from correlation processing section 117-2, which of the A/N resources is used to transmit the signals from terminal 200 or none of the A/N resources is used. When determining that the signals are transmitted using one of the A/N resources from terminal 200, A/N determining section 118 performs coherent detection using a component corresponding to the reference signals and a component corresponding to the A/N and outputs the result of coherent detection to retransmission control signal generating section 122. Meanwhile, when determining that terminal 200 uses none of the A/N resources, A/N determining section 118 outputs the determination result indicating that none of the A/N resources is used to retransmission control signal generating section 122.

Bundled A/N despreading section 119 despreads, using a DFT sequence, the bundled ACK/NACK signals corresponding to the data part of the bundled ACK/NACK resource received from PUCCH extracting section 114 and outputs the despread signals to IDFT section 120.

IDFT section 120 transforms the bundled ACK/NACK signals in the frequency-domain received from bundled A/N despreading section 119 into time-domain signals by IDFT processing and outputs the bundled ACK/NACK signals in the time-domain to bundled A/N determining section 121.

Bundled A/N determining section 121 demodulates the bundled ACK/NACK signals corresponding to the data part of the bundled ACK/NACK resource received from IDFT section 120, using the reference signal information on the bundled ACK/NACK signals that is received from correlation processing section 117-1. In addition, bundled A/N determination section 121 decodes the demodulated bundled ACK/NACK signals and outputs the result of decoding to retransmission control signal generating section 122 as the bundled A/N information. However, when the correlation value received from correlation processing section 117-1 is smaller than a threshold, and bundled A/N determining section 121 thus determines that terminal 200 does not use any bundled A/N resource to transmit the signals, bundled A/N determining section 121 outputs the result of determination to retransmission control signal generating section 122.

Retransmission control signal generating section 122 determines whether or not to retransmit the data transmitted on the downlink component carrier (i.e., downlink data) on the basis of the information inputted from bundled A/N determining section 121 and the information inputted from A/N determining section 118 and generates retransmission control signals based on the result of determination. To put it more specifically, when determining that downlink data transmitted on a certain downlink component carrier needs to be retransmitted, retransmission control signal generating section 122 generates retransmission control signals indicating a retransmission command for the downlink data and outputs the retransmission control signals to data transmission controlling section 106. In addition, when determining that the downlink data transmitted on a certain downlink component carrier does not need to be retransmitted, retransmission control signal generating section 122 generates retransmission control signals indicating not to retransmit the downlink data transmitted on the downlink component carrier and outputs the retransmission control signals to data transmission controlling section 106.

(Configuration of Terminal)

Figure 16:
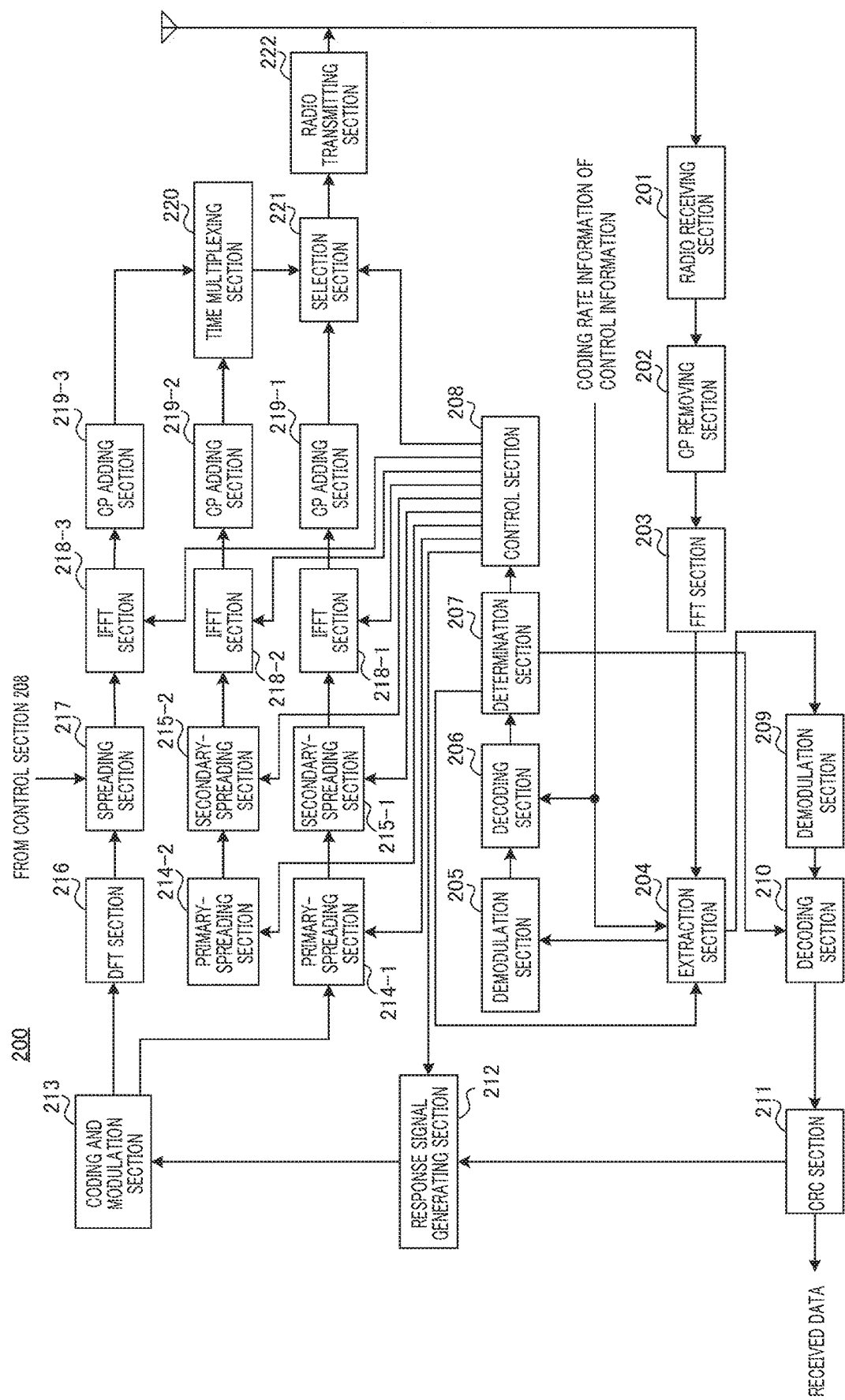
FIG. 16 is a block diagram illustrating a configuration of a terminal according to Embodiment 1 of the present invention.

FIG. 16 is a block diagram illustrating a configuration of terminal 200 according to Embodiment 1. In FIG. 16, terminal 200 includes radio receiving section 201, CP removing section 202, fast Fourier transform (FFT) section 203, extraction section 204, demodulation section 205, decoding section 206, determination section 207, control section 208, demodulation section 209, decoding section 210, CRC section 211, response signal generating section 212, coding and modulation section 213, primary-spreading sections 214-1 and 214-2, secondary-spreading sections 215-1 and 215-2, DFT section 216, spreading section 217, IFFT sections 218-1, 218-2 and 218-3, CP adding sections 219-1, 219-2 and 219-3, time-multiplexing section 220, selection section 221 and radio transmitting section 222.

Radio receiving section 201 receives, via an antenna, OFDM signals transmitted from base station 100 and performs reception processing such as down-conversion, A/D conversion and/or the like on the received OFDM signals. It should be noted that, the received OFDM signals include PDSCH signals assigned to a resource in a PDSCH (i.e., downlink data), or PDCCH signals assigned to a resource in a PDCCH.

CP removing section 202 removes a CP that has been added to the OFDM signals from the OFDM signals that have undergone the reception processing.

FFT section 203 transforms the received OFDM signals into frequency-domain signals by FFT processing and outputs the resultant received signals to extraction section 204.

Extraction section 204 extracts, from the received signals to be received from FFT section 203, downlink control channel signals (i.e., PDCCH signals) in accordance with coding rate information to be received. To put it more specifically, the number of CCEs forming a downlink control information assignment resource varies depending on the coding rate. Thus, extraction section 204 uses the number of CCEs that corresponds to the coding rate as units of extraction processing, and extracts downlink control channel signals. In addition, the downlink control channel signals are extracted for each downlink component carrier. The extracted downlink control channel signals are outputted to demodulation section 205.

Extraction section 204 extracts downlink data (i.e., downlink data channel signals (i.e., PDSCH signals)) from the received signals on the basis of information on the downlink data assignment resource intended for terminal 200 to be received from determination section 207 to be described, hereinafter, and outputs the downlink data to demodulation section 209. As described above, extraction section 204 receives the downlink assignment control information (i.e., DCI) mapped to the PDCCH and receives the downlink data on the PDSCH.

Demodulation section 205 demodulates the downlink control channel signals received from extraction section 204 and outputs the obtained result of demodulation to decoding section 206.

Decoding section 206 decodes the result of demodulation received from demodulation section 205 in accordance with the received coding rate information and outputs the obtained result of decoding to determination section 207.

Determination section 207 performs blind-determination (i.e., monitoring) to find out whether or not the control information included in the result of decoding received from decoding section 206 is the control information intended for terminal 200. This determination is made in units of decoding results corresponding to the units of extraction processing. For example, determination section 207 demasks the CRC bits by the terminal ID of terminal 200 and determines that the control information resulted in CRC=OK (no error) as the control information intended for terminal 200.

Determination section 207 outputs information on the downlink data assignment resource intended for terminal 200, which is included in the control information intended for terminal 200, to extraction section 204.

Furthermore, determination section 207 outputs retransmission information included in the control information intended for terminal 200 indicating whether transmission of downlink data to terminal 200 is initial transmission or retransmission to decoding section 210.

In addition, when detecting the control information (i.e., downlink assignment control information) intended for terminal 200, determination section 207 informs control section 208 that ACK/NACK signals will be generated (or are present). Moreover, when detecting the control information intended for terminal 200 from PDCCH signals, determination section 207 outputs information on a CCE that has been occupied by the PDCCH to control section 208.

Control section 208 identifies the A/N resource associated with the CCE on the basis of the information on the CCE received from determination section 207.

Control section 208 outputs, to primary-spreading section 214-1, a base sequence and a cyclic shift value corresponding to the A/N resource associated with the CCE or the A/N resource previously indicated by base station 100, and also outputs a Walsh sequence and a DFT sequence corresponding to the A/N resource to secondary-spreading section 215-1. In addition, control section 208 outputs the frequency resource information on the A/N resource to IFFT section 218-1.

When determining to transmit bundled ACK/NACK signals using a bundled ACK/NACK resource, control section 208 outputs the base sequence and cyclic shift value corresponding to the reference signal part (i.e., reference signal resource) of the bundled ACK/NACK resource previously indicated by base station 100 to primary-despreading section 214-2 and outputs a Walsh sequence to secondary-despreading section 215-2. In addition, control section 208 outputs the frequency resource information on the bundled ACK/NACK resource to IFFT section 218-2.

Control section 208 outputs a DFT sequence used for spreading the data part of the bundled ACK/NACK resource to spreading section 217 and outputs the frequency resource information on the bundled ACK/NACK resource to IFFT section 218-3.

Control section 208 selects the bundled ACK/NACK resource or the A/N resource and instructs selection section 221 to output the selected resource to radio transmitting section 222. Moreover, control section 208 instructs response signal generating section 212 to generate the bundled ACK/NACK signals or the ACK/NACK signals in accordance with the selected resource.

Demodulation section 209 demodulates the downlink data received from extraction section 204 and outputs the demodulated downlink data (LLR) to decoding section 210.

When the retransmission information received from determination section 207 indicates initial transmission, decoding section 210 stores the downlink data (LLR) received from demodulation section 209 in the retransmission buffer (soft buffer). Decoding section 210 further decodes the downlink data received from demodulation section 209 and outputs the decoded downlink data to CRC section 211. On the other hand, when the retransmission information received from determination section 207 indicates retransmission, decoding section 210 combines the downlink data received from demodulation section 209 and the downlink data read from the retransmission buffer and stores the combined downlink data in the retransmission buffer again. Moreover, decoding section 210 decodes the combined downlink data and outputs the decoded downlink data to CRC section 211. Details of the method of calculating the retransmission buffer size (dividing method) will be described later.

CRC section 211 performs error detection on the decoded downlink data received from decoding section 210, for each downlink component carrier using CRC and outputs an ACK when CRC=OK (no error) or outputs a NACK when CRC=Not OK (error) to response signal generating section 212. Moreover, CRC section 211 outputs the decoded downlink data as the received data when CRC=OK (no error).

Response signal generating section 212 generates response signals on the basis of the reception condition of downlink data (i.e., result of error detection on downlink data) on each downlink component carrier inputted from CRC section 211 and information indicating a predetermined group number. To put it more specifically, when instructed to generate the bundled ACK/NACK signals from control section 208, response signal generating section 212 generates the bundled ACK/NACK signals including the results of error detection for the respective component carriers as individual pieces of data. Meanwhile, when instructed to generate ACK/NACK signals from control section 208, response signal generating section 212 generates ACK/NACK signals of one symbol. Response signal generating section 212 outputs the generated response signals to coding and modulation section 213.

Upon reception of the bundled ACK/NACK signals, coding and modulation section 213 encodes and modulates the received bundled ACK/NACK signals to generate the modulation signals of 12 symbols and outputs the modulation signals to DFT section 216. In addition, upon reception of the ACK/NACK signals of one symbol, coding and modulation section 213 modulates the ACK/NACK signals and outputs the modulation signals to primary-spreading section 214-1.

Primary-spreading sections 214-1 and 214-2 corresponding to the A/N resources and reference signal resources of the bundled ACK/NACK resources spread the ACK/NACK signals or reference signals using the base sequence corresponding to the resources in accordance with the instruction from control section 208 and output the spread signals to secondary-spreading sections 215-1 and 215-2.

Secondary-spreading sections 215-1 and 215-2 spread the received primary-spread signals using a Walsh sequence or a DFT sequence in accordance with an instruction from control section 208 and outputs the spread signals to IFFT sections 218-1 and 218-2.

DFT section 216 performs DFT processing on 12 time-series sets of received bundled ACK/NACK signals to obtain 12 signal components in the frequency-domain. DFT section 216 outputs the 12 signal components to spreading section 217.

Spreading section 217 spreads the 12 signal components received from DFT section 216 using a DFT sequence indicated by control section 208 and outputs the spread signal components to IFFT section 218-3.

IFFT sections 218-1, 218-2 and 218-3 perform IFFT processing on the received signals in association with the frequency positions where the signals are to be allocated, in accordance with an instruction from control section 208. Accordingly, the signals inputted to IFFT sections 218-1, 218-2 and 218-3 (i.e., ACK/NACK signals, the reference signals of A/N resource, the reference signals of bundled ACK/NACK resource and bundled ACK/NACK signals) are transformed into time-domain signals.

CP adding sections 219-1, 219-2 and 219-3 add the same signals as the last part of the signals obtained by IFFT processing to the beginning of the signals as a CP.

Time-multiplexing section 220 time-multiplexes the bundled ACK/NACK signals received from CP adding section 219-3 (i.e., signals transmitted using the data part of the bundled ACK/NACK resource) and the reference signals of the bundled ACK/NACK resource to be received from CP adding section 219-2 on the bundled ACK/NACK resource and outputs the multiplexed signals to selection section 221.

Selection section 221 selects one of the bundled ACK/NACK resource received from time-multiplexing section 220 and the A/N resource received from CP adding section 219-1 and outputs the signals assigned to the selected resource to radio transmitting section 222.

Radio transmitting section 222 performs transmission processing such as D/A conversion, amplification and up-conversion and/or the like on the signals received from selection section 221 and transmits the resultant signals to base station 100 via an antenna.

[Operations of Base Station 100 and Terminal 200]

Operations of base station 100 and terminal 200 having the above-described configurations will be described.

In the following description, carrier aggregation is applied to terminal 200 and terminal 200 communicates with base station 100 using a plurality of component carriers.

A UL-DL configuration (corresponding to a configuration pattern) is set for each of the plurality of component carriers (PCell and SCell).

Moreover, terminal 200 (radio transmitting section 222) transmits response signals corresponding to downlink data received in PCell among a plurality of component carriers and response signals corresponding to downlink data received in SCell using PCell. That is, when carrier aggregation is applied, response signals are always transmitted using PCell. In this case, when the UL-DL configuration set in PCell is different from the UL-DL configuration set in SCell, terminal 200 transmits response signals corresponding to downlink data of SCell using PCell at timings of UL subframes of a reference UL-DL configuration determined based on a combination of the UL-DL configurations of PCell and SCell.

Furthermore, terminal 200 supports DL HARQ and maintains a retransmission buffer (soft buffer). When a plurality of component carriers (PCell and SCell) are set for terminal 200, the soft buffer includes a soft buffer for PCell and a soft buffer for SCell.

In the present embodiment, when a set of DL subframes of a UL-DL configuration set in PCell is a superset of DL subframes of a UL-DL configuration set in SCell (that is, PCell is DL heavy) or when a set of DL subframes of a UL-DL configuration set in PCell is neither superset nor subset of DL subframes of a UL-DL configuration set in SCell (that is, PCell is neither DL heavy nor UL heavy), terminal 200 divides a soft buffer of SCell based on the maximum number of DL HARQ processes defined by a combination of the UL-DL configuration set in PCell and the UL-DL configuration set in SCell.

Hereinafter, the maximum number of DL HARQ processes defined by the combination of the UL-DL configuration set in PCell and the UL-DL configuration set in SCell is called "maximum number of DL HARQ processes to be referenced." In the present embodiment, the maximum number of DL HARQ processes represents a maximum value of the number of DL HARQ processes to be secured in SCell when SCell references a reference UL-DL configuration.

When PCell is DL heavy or PCell is neither DL heavy nor UL heavy, the maximum number of DL HARQ processes to be referenced is set to be equal to or greater than the maximum number of DL HARQ processes defined in the UL-DL configuration set in SCell and less than the maximum number of DL HARQ processes defined in the UL-DL configuration (reference UL-DL configuration) referenced by SCell for PDSCH-PUCCH timings.

FIGS. 17A to 17C are diagrams provided for describing a method of setting the maximum number of DL HARQ processes referenced by SCell. FIG. 17A illustrates a case where Config #0 is set during a non-CA period and FIG. 17B illustrates a case where Config #1 is set in PCell and Config #0 is set in SCell (that is, PCell is DL heavy), and FIG. 17C illustrates a case where Config #1 is set during a non-CA period. Furthermore, in FIG. 17B, SCell references PDSCH-PUCCH timings of Config #1 set in PCell.

For example, in FIG. 17B, the maximum number of DL HARQ processes to be referenced is set to 5 that satisfies 4 or more, which is the maximum number of DL HARQ processes defined in Config #0 (FIG. 17A) set in SCell and less than 7, which is the maximum number of DL HARQ processes defined in Config #1 (FIG. 17C) referenced by SCell for PDSCH-PUCCH timings.

Here, when PCell is DL heavy, the range of setting the maximum number of DL HARQ processes referenced by SCell determined based on the combination of the UL-DL configuration set in PCell and the UL-DL configuration set in SCell will be described.

First, the maximum number of DL HARQ processes referenced by SCell is set to be equal to or greater than the maximum number of DL HARQ processes defined in the UL-DL configuration set in SCell for the following reason. Namely, this is because in PCell which is DL heavy (that is, PCell whose number of UL subframes is small and which has few chances of transmitting PUCCH), PDSCH RTT in SCell increases to guarantee PUCCH transmission corresponding to PDSCH of SCell. For example, at DL HARQ timing (non-CA) based on Config #0 set in the component carrier shown in FIG. 17A, PDSCH RTT is 10 ms. In contrast, when Config #1 (UL-DL configuration to be referenced) (PDSCH RTT is 11 ms) is referenced as PDSCH-PUCCH timing of SCell as shown in FIG. 17B, since a UL-DL configuration which has greater PDSCH RTT and which is DL heavier is referenced, PDSCH RTT is maximum 14 ms, which is greater than PDSCH RTT of the UL-DL configuration to be referenced. Thus, in FIG. 17B compared to FIG. 17A, when PDSCH RTT in SCell increases, the number of DL HARQ processes to which the IR buffer is to be allocated (that is, the maximum number of DL HARQ processes) increases accordingly. To be more specific, the maximum number of DL HARQ processes is four in FIG. 17A and five in FIG. 17B which is incremented by one. Thus, the maximum number of DL HARQ processes referenced by SCell needs to be set to be greater than the maximum number of DL HARQ processes defined in the UL-DL configuration set in SCell.

Here, FIG. 18 illustrates a maximum value of PDSCH RTT in each UL-DL configuration. As shown in FIG. 18, PDSCH RTT in Config #1 is 11 msec, whereas PDSCH RTT in Config #6 is 14 msec. When PCell is Config #1 and SCell is Config #6, if PUCCH transmission for PDSCH in SCell is guaranteed in PCell, although the UL-DL configuration to be referenced (Config #1) is DL heavier than the UL-DL configuration (Config #6) set in SCell, PDSCH RTT is smaller. Thus, only in this combination of UL-DL configurations, the maximum number of DL HARQ processes referenced by SCell is not necessarily greater than the maximum number of DL HARQ processes defined in the UL-DL configuration set in SCell. More specifically, while Config #1 is DL heavier than Config #6, Config #1 has smaller PDSCH RTT, and in a combination when SCell is Config #6 (when PCell is DL heavy) in this case, the equality is attained between the maximum number of DL HARQ processes referenced by SCell (that is, the number of divisions of the soft buffer) and the maximum number of DL HARQ processes defined in the UL-DL configuration set in SCell. Furthermore, while Config #2 is DL heavier than Config #6 and has smaller PDSCH RTT, and in a combination when SCell is Config #6 (when PCell is DL heavy) in this case, the maximum number of DL HARQ processes referenced by SCell (that is, the number of divisions of the soft buffer) is greater than the maximum number of DL HARQ processes defined in the UL-DL configuration set in SCell.

Moreover, the maximum number of DL HARQ processes referenced by SCell is set to be less than the maximum number of DL HARQ processes defined in the UL-DL configuration o be referenced by SCell for the following reason. Namely, this is because while SCell references the UL-DL configuration (Config #1 in FIG. 17B) which is DL heavier than the UL-DL configuration (Config #0 in FIG. 17B) set in SCell, the number of DL subframes assigned to SCell remains that defined in the UL-DL configuration (Config #0 in FIG. 17B) set in SCell. That is, since the number of DL subframes in the UL-DL configuration set in SCell is smaller than that in the UL-DL configuration to be referenced, the number of DL HARQ processes actually required in SCell (maximum number of DL HARQ processes to be referenced) is smaller than the maximum number of DL HARQ processes defined in the UL-DL configuration to be referenced.

The range of setting the maximum number of DL HARQ processes referenced by SCell when PCell is DL heavy has been described with reference to FIGS. 17A to 17C and FIG. 18, and the same applies to a case where PCell is neither DL heavy nor UL heavy.

FIG. 19A illustrates an example of the maximum number of DL HARQ processes referenced by SCell determined based on the combination of UL-DL configurations of PCell and SCell. FIG. 19B illustrates the UL-DL configuration referenced by SCell determined based on the combination of UL-DL configurations of PCell and SCell.

In FIG. 19A, when PCell is UL heavy, the maximum number of DL HARQ processes referenced by SCell is the same as the maximum number of DL HARQ processes (see FIG. 7B) defined in the UL-DL configuration set in SCell.

On the other hand, in FIG. 19A, when PCell is DL heavy or PCell is neither DL heavy nor UL heavy, it is apparent that the maximum number of DL HARQ processes to be referenced in both cases is a value equal to or greater than the maximum number of DL HARQ processes defined in the UL-DL configuration set in SCell and less than the maximum number of DL HARQ processes (see FIG. 7B) defined in the UL-DL configuration referenced by SCell. In FIG. 19A, a first term of the value indicating the maximum number of DL HARQ processes to be referenced indicates the maximum number of DL HARQ processes defined in the UL-DL configuration set in SCell and a second term indicates an increment in the number of DL HARQ processes caused by the aforementioned increase of PDSCH RTT. As described above, when PCell is DL heavy as shown in FIG. 19B, the UL-DL configuration referenced by SCell is the UL-DL configuration set in PCell. On the other hand, when PCell is neither DL heavy nor UL heavy, the UL-DL configuration referenced by SCell is a UL-DL configuration in which DL subframes are set at the same timings as those of both DL subframes of PCell and SCell.

When the maximum number of DL HARQ processes to be referenced shown in FIG. 19A is defined as $M_{REF\_DL\_HARQ,SCell}$, IR buffer size $N_{IR,SCell}$ in SCell is expressed by following equation 2. That is, the SCell soft buffer is divided into the same number of IR buffers as the maximum number of DL HARQ processes to be referenced $M_{REF\_DL\_HARQ,SCell}$ or a predetermined threshold $M_{limit}$, whichever is the smaller (where $K_{MIMO}=1$ is assumed).

[2]
$$N_{IR,SCell} = \left\lfloor \frac{N_{soft}}{K_C \cdot K_{MIMO} \cdot \min(M_{REF\_DL\_HARQ,SCell}, M_{limit})} \right\rfloor \quad \text{(Equation 2)}$$

On the other hand, as for PCell, the set UL-DL configuration is always the same as the UL-DL configuration to be referenced.

Figures 7A, 7B:
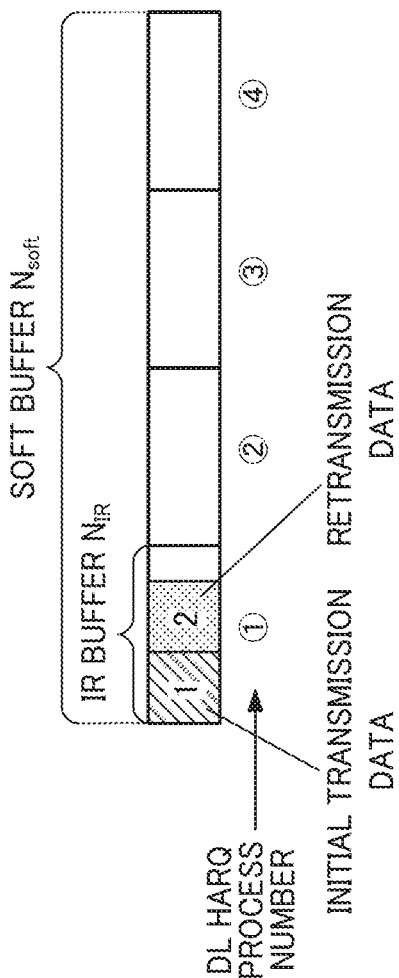
FIGS. 7A and 7B are diagrams provided for describing division of a soft buffer and determination of the maximum number of DL HARQ processes.
Figure 8:
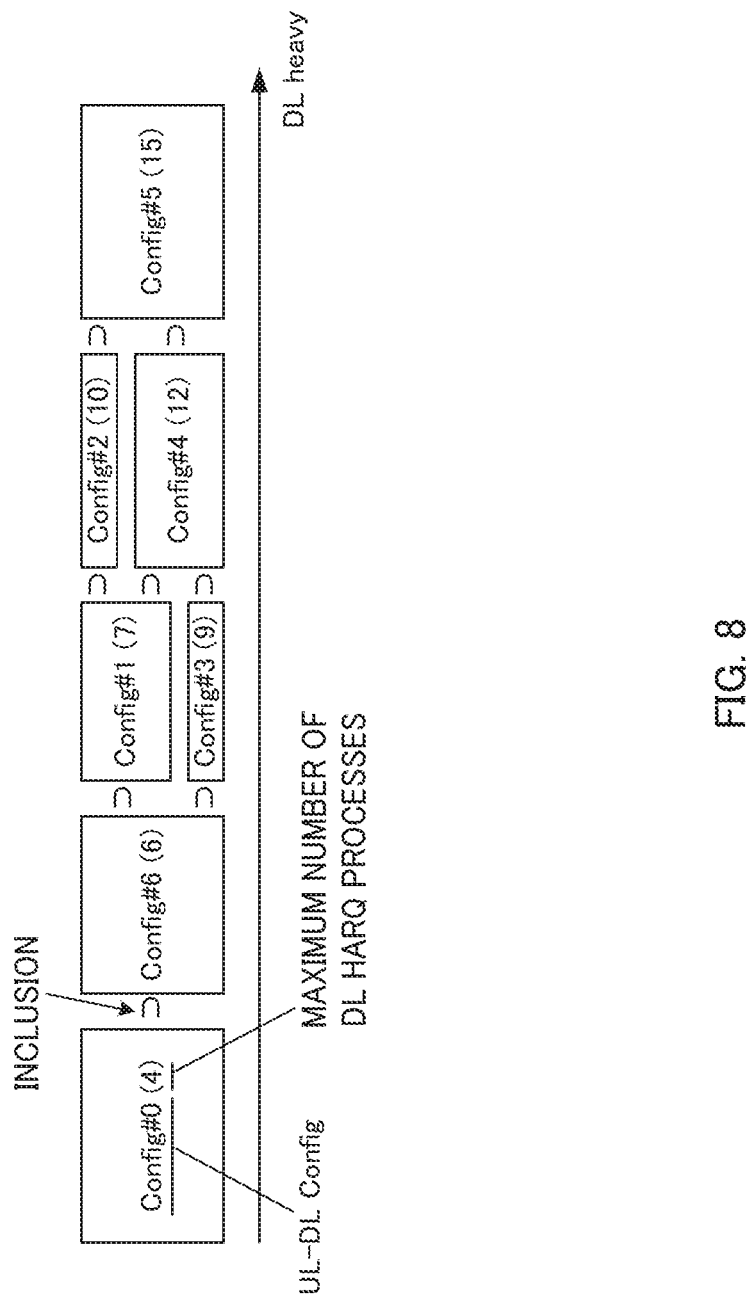
FIG. 8 is a diagram provided for describing inclusion relations of DL subframes among UL-DL configurations.
Figure 9A:
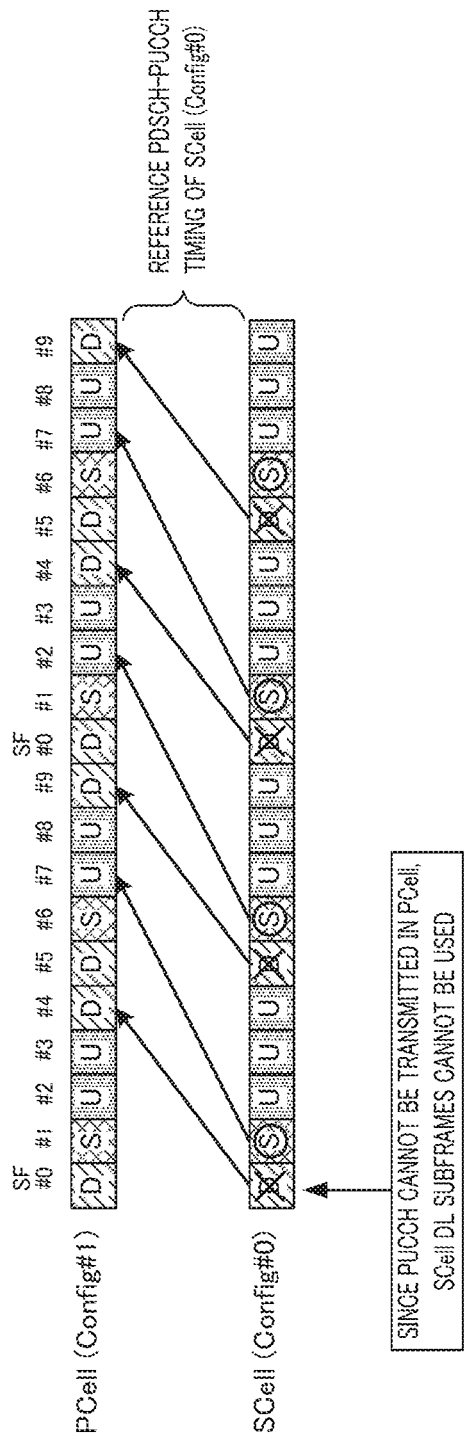
FIGS. 9A and 9B are diagrams provided for describing SCell reference timings when PCell is DL heavy.
Figure 9B:
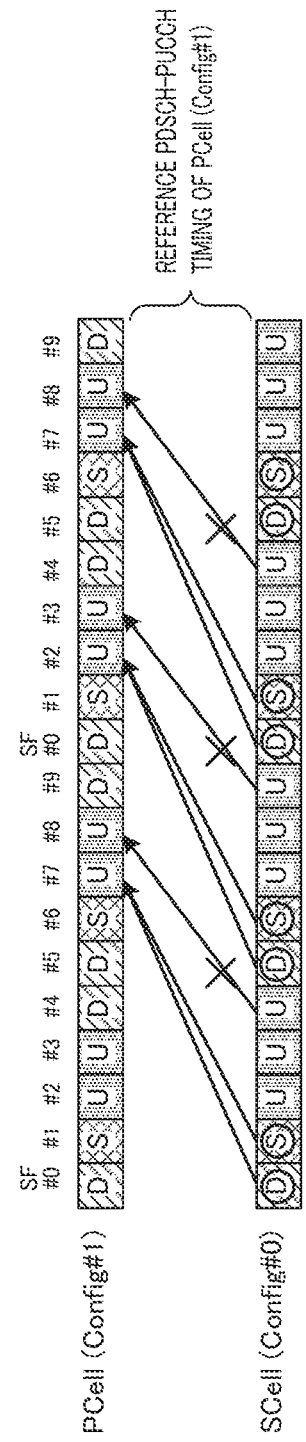
Figure 11:
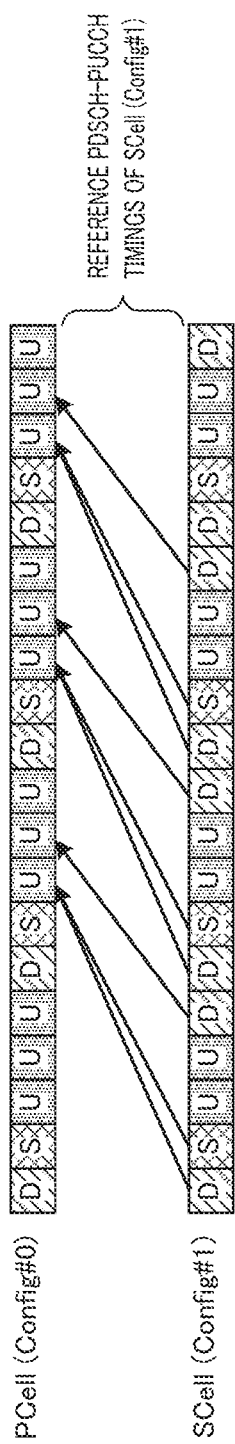
FIG. 11 is a diagram provided for describing SCell reference timings when PCell is UL heavy.
Figure 12A:
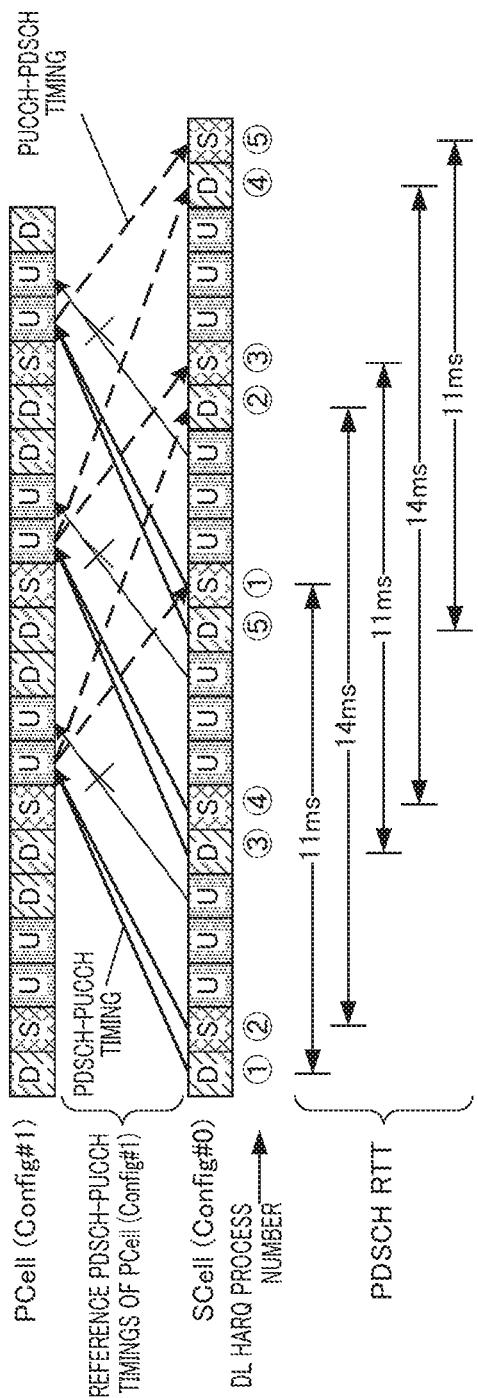
FIGS. 12A and 12B are diagrams provided for describing a problem when PCell is DL heavy.
Figure 12B:
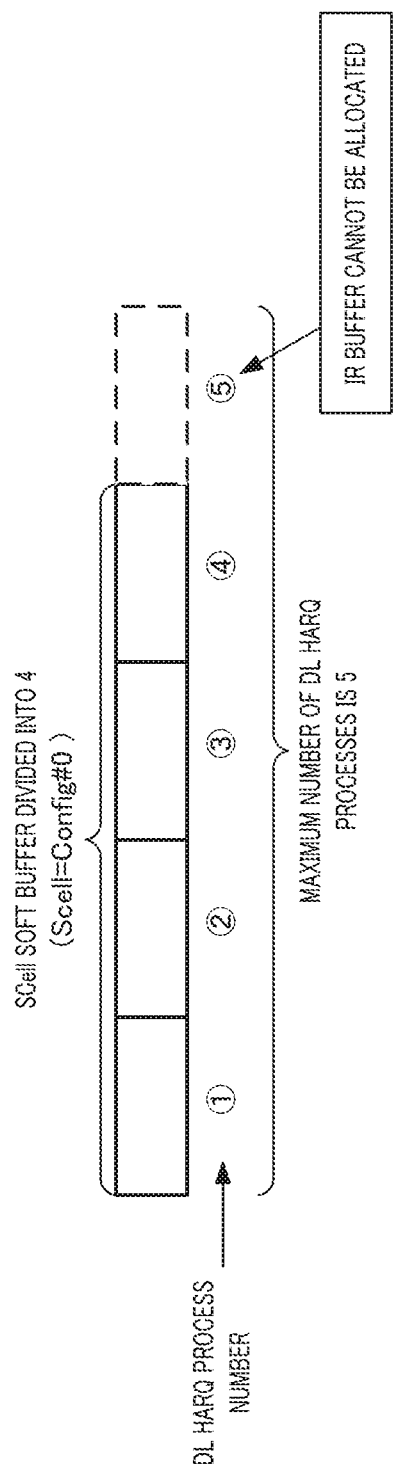
Figure 13A:
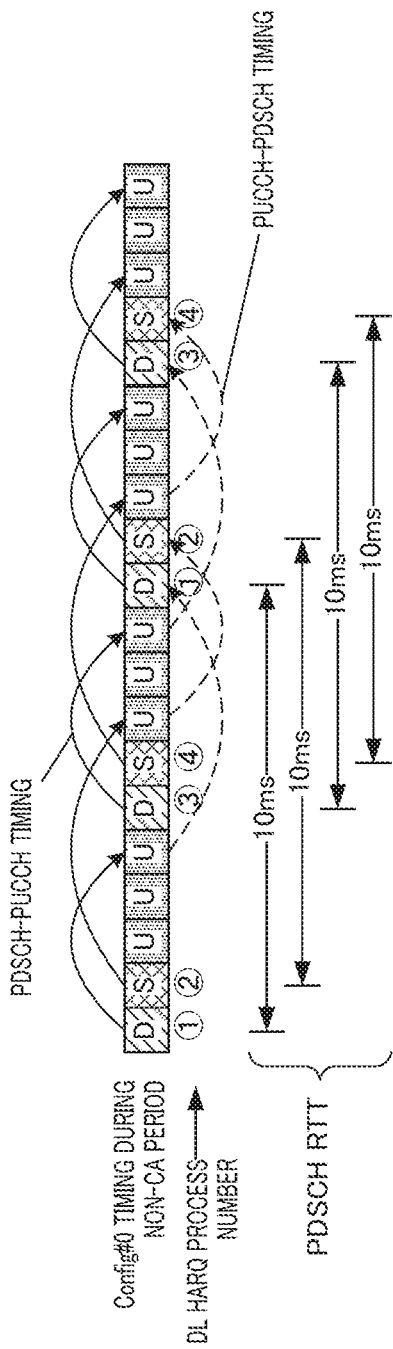
FIGS. 13A and 13B are diagrams provided for describing a problem when
PCell is DL heavy.
Figure 13B:
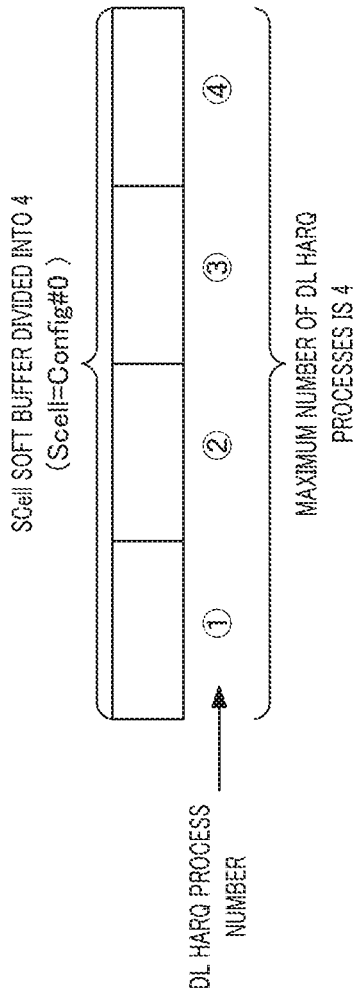

Therefore, if the maximum number of DL HARQ processes defined in FIG. 7B is defined as $M_{DL\_HARQ,PCell}$, IR buffer size $N_{IR,PCell}$ in PCell is expressed by following equation 3.

[3]
$$N_{IR,PCell} = \left\lfloor \frac{N_{soft}}{K_C \cdot K_{MIMO} \cdot \min(M_{DL\_HARQ,PCell}, M_{limit})} \right\rfloor \quad \text{(Equation 3)}$$

For example, base station 100 and terminal 200 previously store a table for determining the maximum number of DL HARQ processes referenced by SCell shown in FIG. 19A. Base station 100 sets respective UL-DL configurations of PCell and SCell for terminal 200. Thus, terminal 200 identifies the maximum number of DL HARQ processes referenced by SCell based on a combination of the respective UL-DL configurations of PCell and SCell set for terminal 200 and the table for determining the maximum number of DL HARQ processes to be referenced stored therein. Terminal 200 then calculates the IR buffer size of SCell ($N_{IR,SCell}$) and the IR buffer size of PCell ($N_{IR,PCell}$) according to equation 2 and equation 3.

For example, terminal 200 for which PCell (Config #1) and SCell (Config #0) shown in FIG. 17B are set sets the maximum number of DL HARQ processes referenced by SCell to 5 with reference to FIG. 19A. Terminal 200 then sets $M_{REF\_DL\_HARQ,SCell}=5$ and calculates the IR buffer size of SCell ($N_{IR,SCell}$) according to equation 2.

Figure 20:
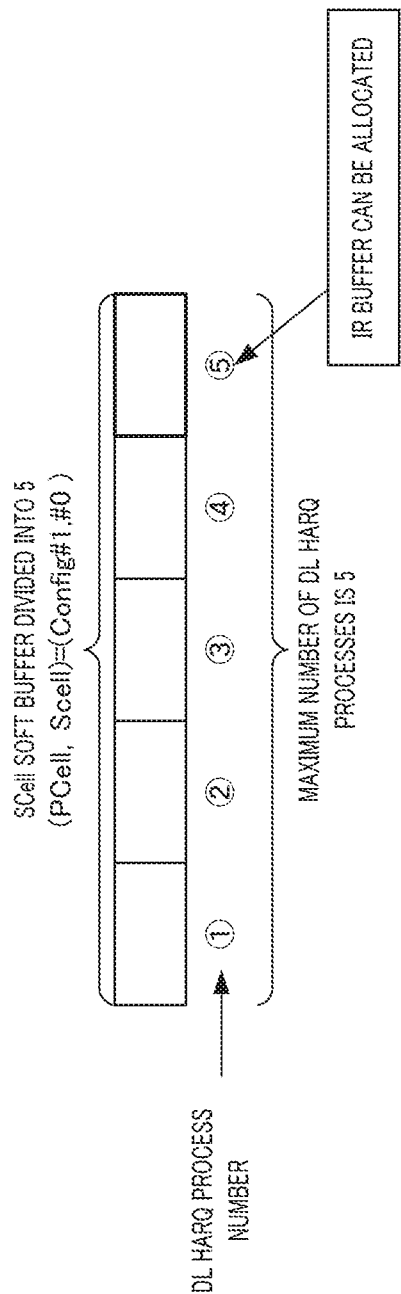
FIG. 20 is a diagram provided for describing a soft buffer dividing method according to Embodiment 1 of the present invention.

That is, as shown in FIG. 20, terminal 200 divides the SCell soft buffer based on the maximum number of DL HARQ processes to be referenced (5 processes). In this way, five IR buffers are allocated to SCell.

As described above, according to the present embodiment, terminal 200 divides the SCell soft buffer into a plurality of IR buffers (buffers for the respective retransmission processes) based on a maximum number of DL HARQ processes to be referenced (corresponding to a specific value) determined by a combination of the UL-DL configuration set in PCell and the UL-DL configuration set in SCell.

This allows terminal 200 to allocate SCell IR buffers based on the number of DL HARQ processes (that is, maximum number of DL HARQ processes to be referenced) taking into account the UL-DL configuration referenced by SCell. By so doing, even when SCell references timings of a UL-DL configuration to be referenced, it is possible to avoid a possibility that IR buffers may not be successfully allocated to some DL HARQ processes and a coding gain by HARQ retransmission may not be obtained.

That is, according to the present embodiment, terminal 200 can allocate IR buffers to all DL HARQ processes for SCell to thereby support DL HARQ. This allows a coding gain by HARQ to be obtained for all DL HARQ processes.

Figure 21:
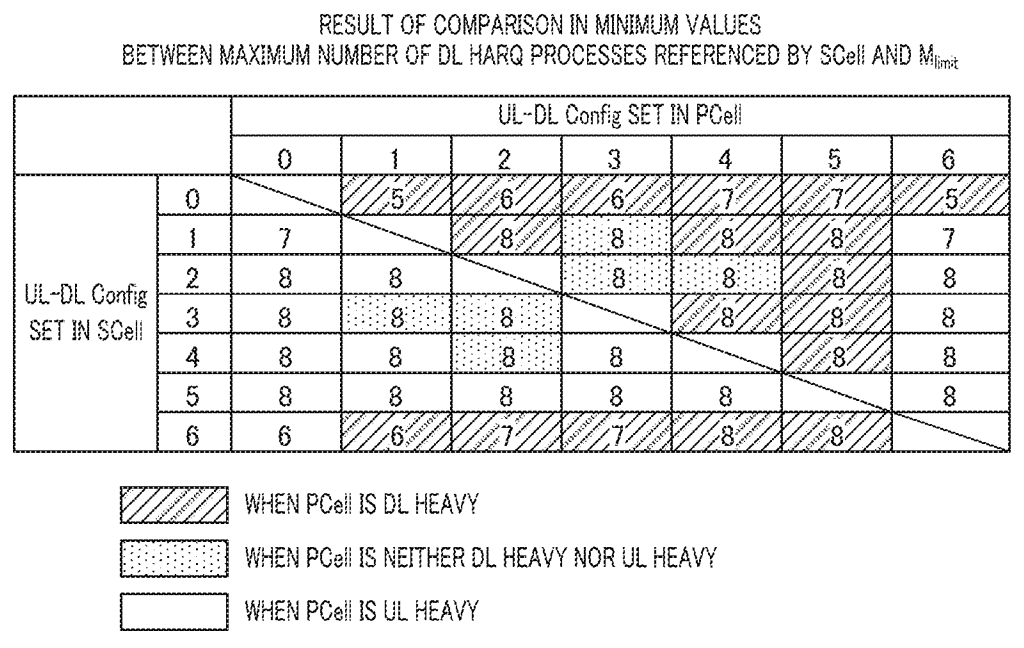

According to the present embodiment, when the IR buffers are allocated as shown in equation 2, the maximum number of DL HARQ processes referenced by SCell $M_{REF\_DL\_HARQ,SCell}$ shown in FIG. 19A is compared with $M_{limit}=8$ and whichever is the smaller is used preferentially. Thus, base station 100 and terminal 200 may previously store a table (e.g., see FIG. 21) for defining the result of calculation of min ($M_{REF\_DL\_HARQ,SCell}, M_{limit}$) shown in equation 2 in each combination of the UL-DL configuration set in PCell and the UL-DL configuration set in SCell. In terminal 200, this eliminates the necessity for calculating min ($M_{REF\_DL\_HARQ,SCell}, M_{limit}$) shown in equation 2.

Furthermore, in the present embodiment, base station 100 and terminal 200 may not store any table for determining the maximum number of DL HARQ processes to be referenced shown in FIG. 19A and base station 100 may indicate the maximum number of DL HARQ processes referenced by SCell $M_{REF\_DL\_HARQ,SCell}$ to terminal 200. That is, base station 100 may indicate the maximum number of DL HARQ processes to be referenced $M_{REF\_DL\_HARQ,SCell}$ which is equal to or greater than the number of DL HARQ processes defined in the UL-DL configuration set in SCell and less than the maximum number of DL HARQ processes defined in the UL-DL configuration referenced by SCell for DL HARQ timings. Alternatively, base station 100 may indicate the result of calculation of min ($M_{REF\_DL\_HARQ,SCell}, M_{limit}$) using the maximum number of DL HARQ processes to be referenced to terminal 200.

(Embodiment 2)

The present embodiment will describe a case where the maximum number of DL HARQ processes defined in a UL-DL configuration referenced by SCell for DL HARQ timings is used as the maximum number of DL HARQ processes referenced by SCell.

Figures 22A, 22B:
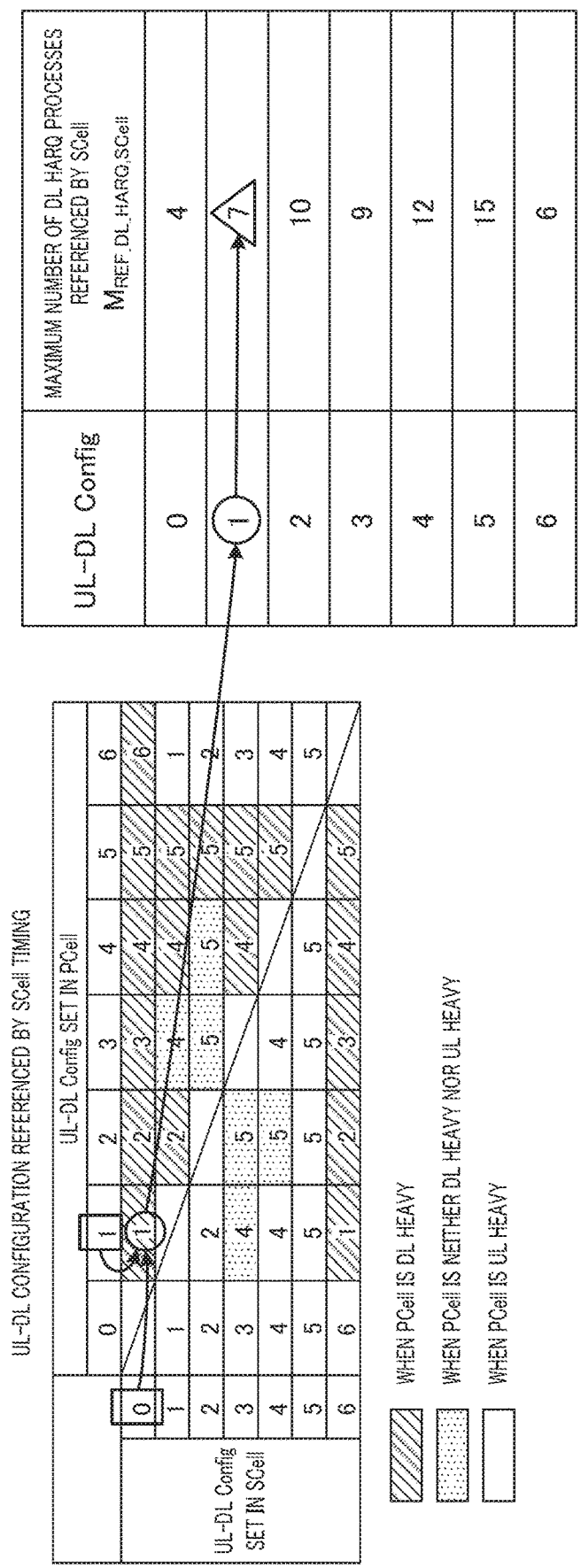
FIGS. 22A and 22B are diagrams provided for describing a method of simply determining the maximum number of DL HARQ processes referenced by SCell according to Embodiment 2 of the present invention.

In the present embodiment, base station 100 and terminal 200 store a table for determining a UL-DL configuration referenced by SCell shown in FIG. 22A to determine the maximum number of DL HARQ processes referenced by SCell and a table for determining the maximum number of DL HARQ processes corresponding to each UL-DL configuration shown in FIG. 22B.

To be more specific, terminal 200 identifies a UL-DL configuration referenced by SCell by referencing the table for determining the UL-DL configuration to be referenced shown in FIG. 22A and a combination of UL-DL configurations respectively set in PCell and SCell. Next, terminal 200 identifies the maximum number of DL HARQ processes referenced by SCell $M_{REF\_DL\_HARQ,SCell}$ by referencing the table for determining the maximum number of DL HARQ processes shown in FIG. 22B and the UL-DL configuration referenced by SCell determined using FIG. 22A. Terminal 200 then divides an SCell soft buffer based on the maximum number of DL HARQ processes to be referenced $M_{REF\_DL\_HARQ,SCell}$ according to equation 2 as in the case of Embodiment 1.

For example, when Config #1 is set in PCell and Config #0 is set in SCell for terminal 200, terminal 200 determines Config #1 as the UL-DL configuration referenced by SCell with reference to the table shown in FIG. 22A. Next, terminal 200 determines the maximum number of DL HARQ processes referenced by SCell $M_{REF\_DL\_HARQ,SCell}=7$ with reference to determined Config #1 and the table shown in FIG. 22B. In this case, terminal 200 divides the SCell soft buffer into seven IR buffers.

In FIG. 22A, when PCell is DL heavy, the UL-DL configuration referenced by SCell is a UL-DL configuration set in PCell and when PCell is UL heavy (that is, SCell is DL heavy), the UL-DL configuration referenced by SCell is a UL-DL configuration set in SCell, and when PCell is neither DL heavy nor UL heavy, the UL-DL configuration referenced by SCell is a UL-DL configuration which is DL heavy with respect to both PCell and SCell.

That is, the same or a DL heavy UL-DL configuration with respect to the UL-DL configuration set in SCell is always set as the UL-DL configuration referenced by SCell.

The DL heavier the UL-DL configuration, the greater the number of DL HARQ processes that is required. However, as described in Embodiment 1, when SCell references DL HARQ timings of the UL-DL configuration to be referenced, the number of DL HARQ processes necessary for SCell never exceeds the maximum number of DL HARQ processes defined in the UL-DL configuration referenced by SCell.

Thus, as in the case of the present embodiment, using the maximum number of DL HARQ processes defined in the UL-DL configuration referenced by SCell as the maximum number of DL HARQ processes referenced by SCell used to determine the number of divisions of the SCell soft buffer, terminal 200 can allocate the IR buffers to all DL HARQ processes for SCell to thereby support DL HARQ. Thus, according to the present embodiment, it is possible to obtain a coding gain by HARQ for all DL HARQ processes.

FIG. 22B is the same table as the existing table shown in FIG. 7B. Moreover, FIG. 22A is the same table as that in FIG. 19B. The table shown in FIG. 22A (FIG. 19B) is a table necessary to define DL HARQ timings of SCell (that is, transmission timing of response signals of SCell transmitted using PCell) as described above. That is, the table shown in FIG. 22A is a necessary table regardless of the determination of the number of divisions of the SCell soft buffer. That is, in the present embodiment, base station 100 and terminal 200 need not store new tables (e.g., the table shown in FIG. 19A) to determine the number of divisions of the SCell soft buffer. According to the present embodiment, it is thereby possible to make the configurations of base station 100 and terminal 200 simpler than those in Embodiment 1.
(Embodiment 3)

Embodiment 1 has described instances when cross-carrier scheduling is not set (which may also be referred to as "when CIF (cross indicator field) is not set" or "when self-scheduling is set"). That is, a case has been described in Embodiment 1 where DL assignment of PCell to PDSCH (resource assignment information) is indicated by PDCCH of PCell and DL assignment of SCell to PDSCH is indicated by PDCCH of SCell.

In contrast, the present embodiment will describe a case where a cross-carrier scheduling setting is taken into account.

Cross-carrier scheduling is a technique that uses PDCCH of a certain component carrier to schedule resource assignment of another component carrier. For example, in preparation for a case where when quality of PDCCH in SCell cannot be guaranteed in such a case as when terminal 200 receives large interference regarding DL assignment (resource assignment information) of SCell to PDSCH, cross-carrier scheduling from PCell to SCell is performed. In this case, base station 100 indicates DL assignment of SCell to PDSCH using PDCCH of PCell (e.g., dotted line arrows shown in FIGS. 23A and 23B).

Figure 23A:
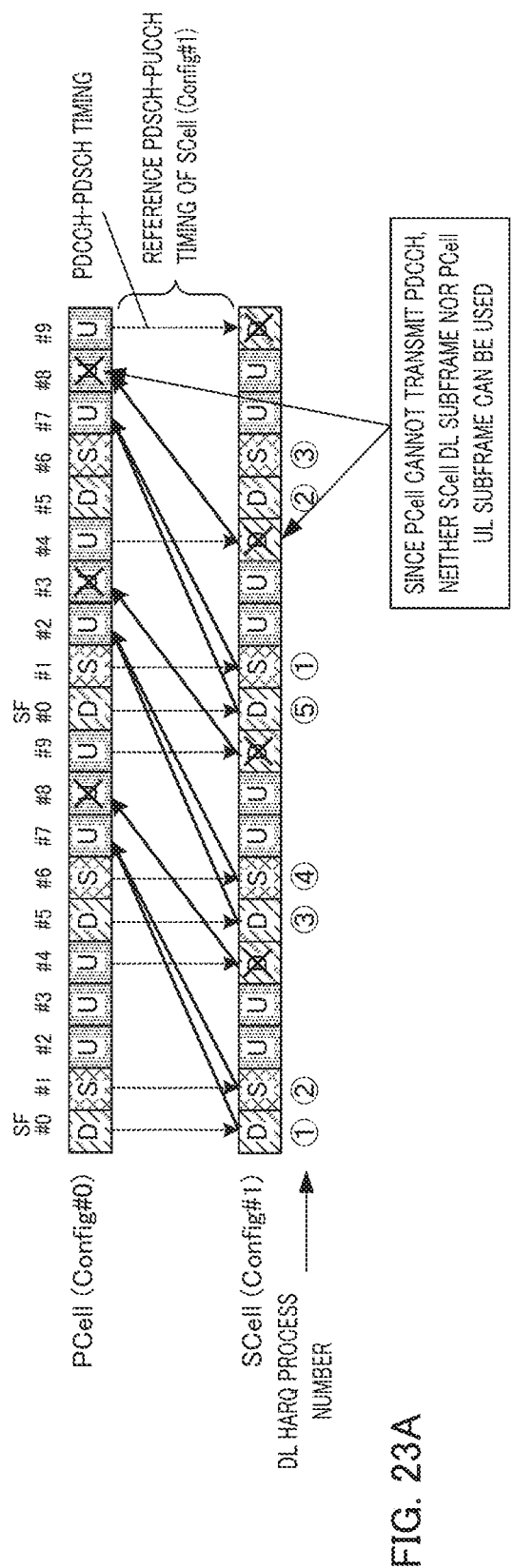
FIGS. 23A and 23B are diagrams provided for describing timings referenced by SCell when cross-carrier scheduling is set.

When cross-carrier scheduling is set and when PCell is UL heavy (see FIG. 23A) or when PCell is neither DL heavy nor UL heavy (not shown), there are timings at which PCell becomes a UL subframe and SCell becomes a DL subframe (e.g., SF #4 and #9 shown in FIG. 23A). At these timings, base station 100 cannot indicate DL assignment indicating PDSCH of SCell using PDCCH of PCell, and therefore it is not possible to assign PDSCH of SCell. Therefore, DL subframes of SCell cannot be used at the timings.

On the other hand, when cross-carrier scheduling is not set (not shown), DL assignment indicating PDSCH of SCell is indicated using PDCCH of SCell, and therefore DL subframes can be used in SCell even at timings at which PCell becomes a UL subframe and SCell becomes a DL subframe.

Thus, whether or not it is possible to use DL subframes of SCell at timings at which PCell becomes a UL subframe and SCell becomes a DL subframe is one of differences when cross-carrier scheduling is not set and when cross-carrier scheduling is set in a case where a UL-DL configuration varies among a plurality of component carriers.

Since DL subframes of SCell cannot be used at the above-described timings, the number of DL subframes usable in SCell is smaller when cross-carrier scheduling is set than when cross-carrier scheduling is not set. For this reason, the maximum number of DL HARQ processes referenced by SCell is also smaller when cross-carrier scheduling is set than when cross-carrier scheduling is not set. Thus, the number of divisions of the SCell soft buffer determined based on the maximum number of DL HARQ processes referenced by SCell is smaller when cross-carrier scheduling is set than when cross-carrier scheduling is not set.

Figure 23B:
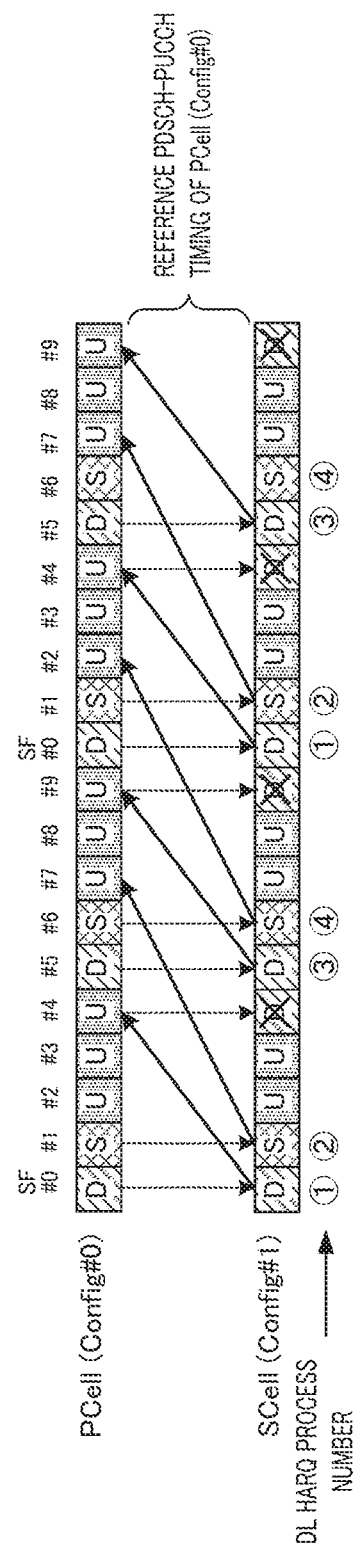

Note that in FIG. 23A, at timings at which PCell becomes a UL subframe and SCell becomes a DL subframe (SF #4, #9), neither DL subframes of SCell nor UL subframes (SF #8, #3) of PCell corresponding to the DL subframes at PDSCH-PUCCH timings can be used. For this reason, when cross-carrier scheduling is set and when PCell is UL heavy, it is preferable for SCell to always reference PDSCH-PUCCH timings of a UL-DL configuration set in PCell as shown in FIG. 23B. This makes it possible to avoid a possibility that UL subframes of PCell corresponding to DL subframes of SCell at PDSCH-PUCCH timings may not be used.

Figure 24:
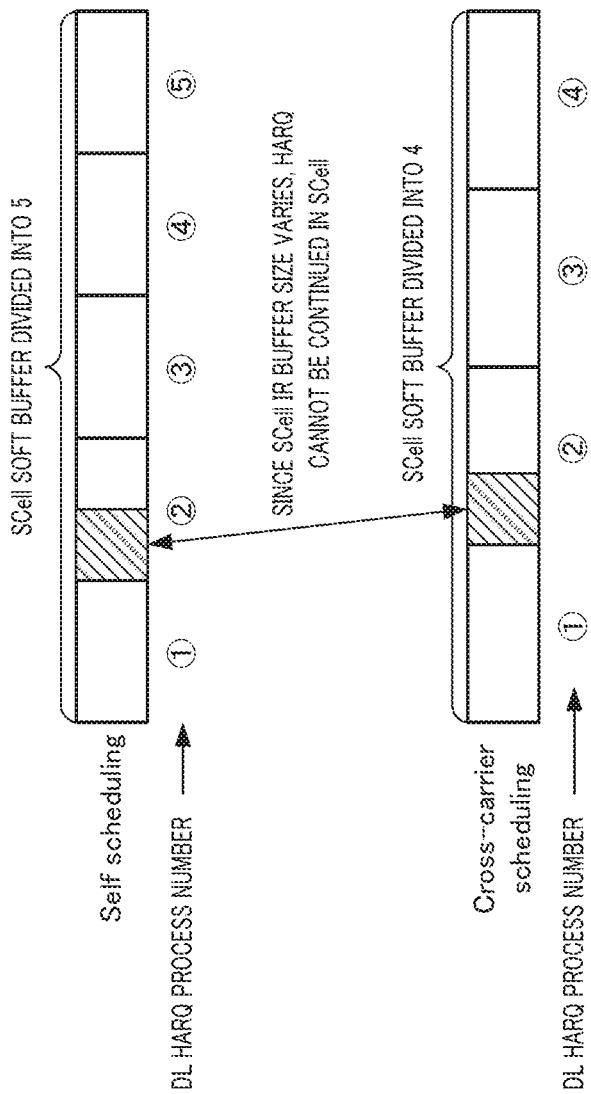
FIG. 24 is a diagram provided for describing a problem when cross-carrier scheduling is set.

By the way, whether or not to set cross-carrier scheduling is changed based on indication of RRC (radio resource control) from base station 100. Moreover, as described above, the number of divisions of the SCell soft buffer and the number of DL HARQ processes vary when cross-carrier scheduling is set and when cross-carrier scheduling is not set. Therefore, when base station 100 changes the setting of cross-carrier scheduling, as shown in FIG. 24, the number of divisions of the SCell soft buffer is changed before and after the setting change and the reference position of data stored in the soft buffer changes.

For this reason, there is a problem that DL HARQ of SCell cannot be continued before and after the setting of cross-carrier scheduling is changed.

Thus, in the present embodiment, terminal 200 divides the SCell soft buffer based on the maximum number of DL HARQ processes to be referenced when cross-carrier scheduling is set or when cross-carrier scheduling is not set (that is, when self-scheduling is set), whichever is the greater. That is, the number of divisions of the soft buffer is determined based on not the situation as to whether or not cross-carrier scheduling is set, but the maximum number of DL HARQ processes to be referenced when either one scheduling method is set.

More specifically, as described above, the maximum number of DL HARQ processes to be referenced is greater when cross-carrier scheduling is not set than when cross-carrier scheduling is set. Thus, terminal 200 divides the SCell soft buffer not based on the situation as to whether or not cross-carrier scheduling is set, but always based on the maximum number of DL HARQ processes to be referenced when cross-carrier scheduling is not set. For example, terminal 200 may also determine the maximum number of DL HARQ processes to be referenced when cross-carrier scheduling is not set with reference to the table shown in FIG. 19A as in the case of Embodiment 1. Alternatively, terminal 200 may determine the maximum number of DL HARQ processes to be referenced when cross-carrier scheduling is not set with reference to the table shown in FIG. 22A and FIG. 22B as in the case of Embodiment 2.

By so doing, when cross-carrier scheduling is not set, it is possible to allocate IR buffers to all DL HARQ processes and support DL HARQ as in the case of Embodiment 1 or 2. Moreover, when cross-carrier scheduling is set with a smaller number of necessary DL HARQ processes than when cross-carrier scheduling is not set, it is possible to allocate IR buffers to all DL HARQ processes and support DL HARQ. Therefore, according to the present embodiment, it is possible to allocate IR buffers to all DL HARQ processes and support DL HARQ before and after changing the setting of cross-carrier scheduling.

Furthermore, according to the present embodiment, the method of dividing the SCell soft buffer is not changed before and after changing the setting of cross-carrier scheduling. Thus, the reference position of data stored in the soft buffer is not changed before and after changing the setting of cross-carrier scheduling, and it is thereby possible to continue DL HARQ processes of SCell. Thus, it is possible to obtain a coding gain by HARQ for all DL HARQ processes.

Figure 25:
FIG. 25 is a diagram illustrating the maximum number of DL HARQ processes referenced by SCell when cross-carrier scheduling is set according to Embodiment 3 of the present invention.

When the setting of cross-carrier scheduling is less frequently changed, the coding gain associated with the fact of being able to continue DL HARQ before and after changing the setting of cross-carrier scheduling is reduced. That is, when the setting of cross-carrier scheduling is less frequently changed, the influence of the fact of not being able to continue DL HARQ is small. Thus, when the setting of cross-carrier scheduling is less frequently changed, base station 100 and terminal 200 may determine the maximum number of DL HARQ processes referenced by SCell with reference to the table shown in FIG. 25 when cross-carrier scheduling is set or determine the maximum number of DL HARQ processes referenced by SCell with reference to the table in Embodiment 1 (FIG. 19A) or the table in Embodiment 2 (FIG. 22A and FIG. 22B) when cross-carrier scheduling is not set. In FIG. 25, when PCell is UL heavy, the maximum number of DL HARQ processes defined in the UL-DL configuration set in PCell is set as the maximum number of DL HARQ processes to be referenced. Moreover, in FIG. 25, when PCell is DL heavy or PCell is neither DL heavy nor UL heavy, a value obtained by subtracting from the maximum number of DL HARQ processes (first term) defined in the UL-DL configuration set in PCell, the decrement (second term) in the number of DL HARQ processes caused by a reduction in the number of DL subframes that cannot be used from the UL-DL configuration set in PCell due to the fact that DL subframes cannot be used at timings at which PCell becomes a DL subframe and SCell becomes a UL subframe, is set as the maximum number of DL HARQ processes to be referenced.

(Embodiment 4)

The present embodiment will describe a case where a UL-DL configuration of each component carrier is dynamically changed (that is, when TDD eIMTA is applied).

As an example of application of TDD eIMTA, a UL-DL configuration may be dynamically changed in a pico cell (SCell) in inter-band carrier aggregation between a macro cell (Pcell) and a pico cell (SCell).

When different UL-DL configurations are set between terminals supporting TDD eIMTA, interference from uplink communication to downlink communication (hereinafter may be referred to as "UL-DL interference") may occur between the terminals. To avoid the occurrence of this UL-DL interference, terminals supporting TDD eIMTA may change the UL-DL configuration not for each terminal (UE specific) but for each cell (cell specific).

When the UL-DL configuration is changed for each cell, many terminals supporting TDD eIMTA are likely to change the UL-DL configuration while all DL HARQ processes have not been completed (that is, no ACK has been returned to the base station).

Furthermore, as shown in FIG. 7B, the maximum number of DL HARQ processes ($M_{DL\_HARQ}$) varies among different UL-DL configurations. For this reason, when the maximum number of DL HARQ processes corresponding to any one UL-DL configuration at least before and after the change is less than 8, the IR buffer size per TB also varies before and after the change of the UL-DL configuration. For example, in FIG. 26, when Config #0 is changed to Config #1, the maximum number of DL HARQ processes is also changed from 4 to 7.

Figure 26:
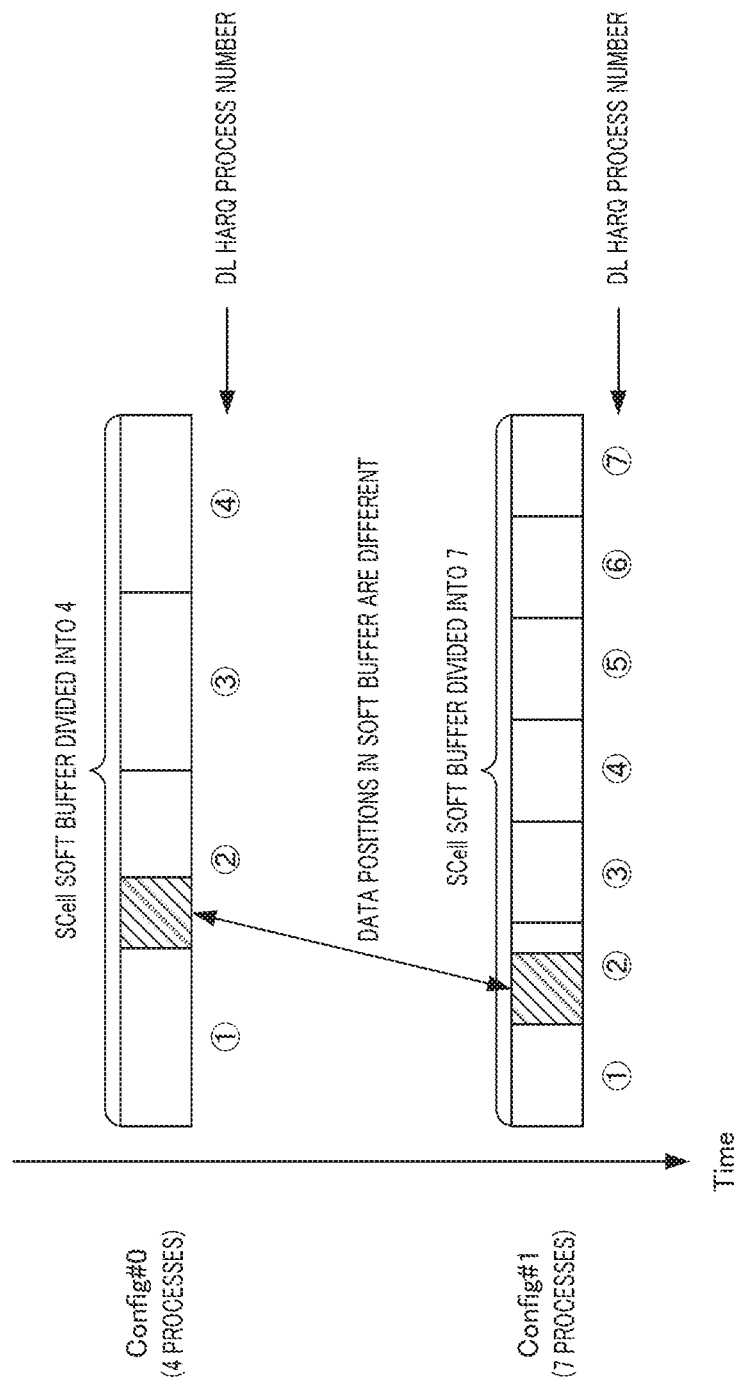
FIG. 26 is a diagram provided for describing a problem when TDD eIMTA is set.

Thus, as shown in FIG. 26, since the number of divisions of the soft buffer also varies before and after the change of the UL-DL configuration, the data reference position in the soft buffer varies before and after the change of the UL-DL configuration. For this reason the terminal cannot correctly read the stored data and cannot continue DL HARQ before and after the change of the UL-DL configuration, and therefore there is concern about deterioration of HARQ retransmission performance before and after the change of the UL-DL configuration. Although the deterioration of HARQ retransmission performance is observed in aforementioned method (1) of changing the UL-DL configuration or in the case of a change of the UL-DL configuration with a low or medium frequency as shown in method (2), such deterioration of HARQ retransmission performance appears more noticeably particularly when the UL-DL configuration is changed with a high frequency as shown in method (3).

Thus, in the present embodiment, when different UL-DL configurations are set between component carriers and when a UL-DL configuration is dynamically changed in each cell, base station 100 limits a combination of UL-DL configurations of PCell and SCell that can be set for terminal 200 and divides the SCell soft buffer using a maximum value of the maximum number of DL HARQ processes to be referenced defined in the combination of UL-DL configurations. That is, terminal 200 divides the SCell soft buffer based on a maximum value of the maximum number of DL HARQ processes to be referenced respectively determined by candidate groups of combinations of UL-DL configurations of PCell and SCell that can be set for terminal 200.

FIG. 27A illustrates an example of the method of setting the maximum number of DL HARQ processes referenced by SCell according to the present embodiment. FIG. 27B illustrates an example of the UL-DL configuration referenced by SCell according to the present embodiment.

In the following description, among the combinations of UL-DL configurations of PCell and SCell shown in FIG. 27A, combinations (PCell, SCell) that can be set for terminal 200 are assumed to be the following six sets: (Config #0, Config #0), (Config #0, Config #6), (Config #0, Config #1), (Config #6, Config #6), (Config #6, Config #1) and (Config #1 , Config #1) (combinations enclosed by ellipses).

As shown in FIG. 27A, the maximum number of DL HARQ processes referenced by SCell are 4, 6, 7, 6, 7, 7 respectively in order of combinations (PCell, SCell) of PCell and SCell that can be set for terminal 200 above. Terminal 200 divides the SCell soft buffer using the maximum value 7 among these maximum numbers of DL HARQ processes to be referenced. For example, assuming $M_{REF\_DL\_HARQ, SCell}=7$ in equation 2, terminal 200 calculates IR buffers for SCell. In this case, terminal 200 divides the SCell soft buffer into seven IR buffers.

By so doing, even when the combination of PCell and SCell is changed to any combination that can be set for terminal 200, terminal 200 will never run short of SCell IR buffers. Thus, according to the present embodiment, terminal 200 can obtain a coding gain by HARQ for all DL HARQ processes corresponding to SCell.

Since the number of divisions of the SCell soft buffer is not changed before and after the change of the UL-DL configuration, data reference positions on the soft buffer are not changed either. Thus, even when the UL-DL configuration is changed, terminal 200 can correctly read the data stored before the change, and can thereby continue DL HARQ before and after the change of the UL-DL configuration. According to the present embodiment, it is possible to avoid deterioration of HARQ retransmission performance before and after the change of the UL-DL configuration.

Base station 100 may previously indicate combinations of UL-DL configurations of PCell and SCell that can be set for terminal 200. Alternatively, instead of indicating combinations of UL-DL configurations of PCell and SCell that can be set for terminal 200, base station 100 may indicate the result of calculation of min ($M_{REF\_DL\_HARQ, SCell}, M_{limit}$) to terminal 200. In this case, since the calculation result takes values 4 to 8, the result can be indicated using 3 bits. On the other hand, since there are seven UL-DL configurations of Config #0 to #6 (3 bits) to indicate combinations of UL-DL configurations of PCell and SCell, (3+3)×n (n: number of combinations) bits are required. Base station 100 indicates only the above calculation result, and it is thereby possible to drastically reduce the number of bits to be indicated to terminal 200 compared to the case where combinations of UL-DL configurations of PCell and SCell are indicated.

In FIG. 27A, there are 34 out of total 49 sets of combinations in which the maximum number of DL HARQ processes referenced by SCell becomes 8 or more, which is a large number. Therefore, the calculation result of min ($M_{REF\_DL\_HARQ, SCell}, M_{limit}$) in equation 2 is likely to be 8 (=$M_{limit}$) in many combinations. Thus, base station 100 may not previously indicate the combinations of UL-DL configurations of PCell and SCell that can be set for terminal 200 or the calculation result of min ($M_{REF\_DL\_HARQ, SCell}, M_{limit}$) to terminal 200, and terminal 200 may perform the following operation.

To be more specific, when different UL-DL configurations are set between component carriers and UL-DL configurations are set to be dynamically changed (when TDD eIMTA is set), terminal 200 may calculate the IR buffer size of SCell by always assuming min ($M_{REF\_DL\_HARQ, SCell}, M_{limit}$)=8. On the other hand, when different UL-DL configurations are set between component carriers and UL-DL configurations are not set to be dynamically changed (when TDD eIMTA is not set), terminal 200 may calculate the IR buffer size of SCell according to the methods shown in Embodiments 1 to 3.

A case where cross-carrier scheduling is set may also be studied in the present embodiment as in the case of Embodiment 3. That is, terminal 200 may divide the SCell soft buffer into equal portions using a maximum value between the maximum number of DL HARQ processes to be referenced when cross-carrier scheduling is not set which is defined by combinations of UL-DL configurations of PCell and SCell that can be set for terminal 200 and the maximum number of DL HARQ processes to be referenced when cross-carrier scheduling is set.

More specifically, as described in Embodiment 3, the maximum number of DL HARQ processes to be referenced is greater when cross-carrier scheduling is not set than when cross-carrier scheduling is set. Thus, terminal 200 may divide the SCell soft buffer always using a maximum value among the maximum numbers of DL HARQ processes to be referenced when cross-carrier scheduling is not set which is defined by combinations of UL-DL configurations that can be set for terminal 200 irrespective of whether or not cross-carrier scheduling is set.

The embodiments of the present invention have been described so far.

The expression "SCell" has been used in the embodiments of the present invention, but SCell is not limited to one SCell or SCell for which one type of UL-DL configuration is set. That is, this is applicable to PCell and each SCell respectively. Furthermore, different UL-DL configurations may be set to respective SCells.

Although an antenna has been described in the aforementioned embodiments, the present invention may be similarly applied to an antenna port.

The term "antenna port" refers to a logical antenna including one or more physical antennas. In other words, the term "antenna port" does not necessarily refer to a single physical antenna, and may sometimes refer to an antenna array including a plurality of antennas, and/or the like.

For example, how many physical antennas are included in the antenna port is not defined in LTE, but the antenna port is defined as the minimum unit allowing the base station to transmit different reference signals in LTE.

In addition, an antenna port may be specified as a minimum unit to be multiplied by a precoding vector weighting.

In the foregoing embodiments, the present invention is configured with hardware by way of example, but the invention may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A terminal apparatus according to the embodiments described above is an apparatus which communicates with a base station apparatus using a plurality of component carriers and for which a configuration pattern of subframes included in one frame is set for each of the plurality of component carriers, the configuration pattern including a downlink communication subframe used for downlink communication and an uplink communication subframe used for uplink communication, the terminal apparatus including: a decoding section that stores, in a retransmission buffer, downlink data transmitted in each of the plurality of component carriers and decodes the downlink data; a generating section that generates a response signal using a result of error detection of the downlink data; and a transmitting section that transmits, using a first component carrier of the plurality of component carriers, a response signal for first downlink data received using the first component carrier and a response signal for second downlink data received using a second component carrier of the plurality of component carriers, in which: the buffer includes a first buffer that stores the first downlink data and a second buffer that stores the second downlink data; and the second buffer is divided into regions respectively corresponding to retransmission processes based on a specific value determined by a combination of a first configuration pattern that is set in the first component carrier and a second configuration pattern that is set in the second component carrier.

In the terminal apparatus according to the embodiments described above: when the first configuration pattern and the second configuration pattern are different, the transmitting section transmits a response signal for the second downlink data using the first component carrier at a timing of an uplink communication subframe of a third configuration pattern to be determined based on the combination; and the specific value is a maximum value of a number of retransmission processes defined in the third configuration pattern.

In the terminal apparatus according to the embodiments described above: in the combination including the first configuration pattern in which a downlink communication subframe is set at least at a timing identical to a timing of a downlink communication subframe of the second configuration pattern, the third configuration pattern is the first configuration pattern; in the combination in which the first configuration pattern and the second configuration pattern respectively include downlink communication subframes that are set at least at different timings, the third configuration pattern is a fourth configuration pattern in which downlink communication subframes are set at least at timings identical to the timings of both downlink communication subframes of the first configuration pattern and the second configuration pattern; and in the combination including the second configuration pattern in which a downlink communication subframe is set at least at a timing identical to a timing of downlink communication subframe of the first configuration pattern, the third configuration pattern is the second configuration pattern.

In the terminal apparatus according to the embodiments described above: when the first configuration pattern and the second configuration pattern are different, the transmitting section transmits a response signal for the second downlink data using the first component carrier at a timing of an uplink communication subframe of a third configuration pattern to be determined based on the combination; in a first combination including the first configuration pattern in which a downlink communication subframe that is set at least at a timing identical to a timing of a downlink communication subframe of the second configuration pattern, or in a second combination in which the first configuration pattern and the second configuration pattern respectively include downlink communication subframes that are set at least at different timings, the specific value is a value equal to or greater than a maximum value of a number of retransmission processes defined in the second configuration pattern but less than a maximum value of a number of retransmission processes defined in the third configuration pattern; and in a third combination including the second configuration pattern in which a downlink communication subframe that is set at least at a timing identical to a timing of a downlink communication subframe of the first configuration pattern, the specific value is a maximum value of a number of retransmission processes defined in the second configuration pattern.

In the terminal apparatus according to the embodiments described above: in the first combination, the third configuration pattern is the first configuration pattern; in the second combination, the third configuration pattern is a fourth configuration pattern in which downlink communication subframes are set at least at timings identical to the timings of both downlink communication subframes of the first configuration pattern and the second configuration pattern; and in the third combination, the third configuration pattern is the second configuration pattern.

In the terminal apparatus according to the embodiments described above: a scheduling method for the terminal apparatus is switchable between a first scheduling method that indicates resource assignment information on the first downlink data using the first component carrier and that indicates resource assignment information on the second downlink data using the second component carrier, and a second scheduling method that indicates resource assignment information on both the first downlink data and the second downlink data using the first component carrier; and the second buffer is divided based on the specific value when the first scheduling method is set.

In the terminal apparatus according to the embodiments described above, the specific value is a maximum value among values respectively determined from candidate groups of the combinations allowed to be set for the terminal apparatus.

In the terminal apparatus according to the embodiments described above, the second buffer is divided into a number of regions that is identical to a smaller one of the specific value and a predetermined threshold.

In the terminal apparatus according to the embodiments described above, the first component carrier is a primary cell and the second component carrier is a secondary cell.

A buffer dividing method according to the embodiments described above is a method for a terminal apparatus which communicates with a base station apparatus, using a plurality of component carriers and in which a configuration pattern of subframes included in one frame is set for each of the plurality of component carriers, the configuration pattern including a downlink communication subframe used for downlink communication and an uplink communication subframe used for uplink communication, the method including: storing, in a retransmission buffer, downlink data transmitted in each of the plurality of component carriers; decoding the downlink data; generating a response signal using a result of error detection of the downlink data; and transmitting, using a first component carrier of the plurality of component carriers, a response signal for first downlink data received in the first component carrier and a response signal for second downlink data received in a second component carrier of the plurality of component carriers, in which: the buffer includes a first buffer that stores the first downlink data and a second buffer that stores the second downlink data; and the second buffer is divided into regions respectively corresponding to retransmission processes based on a specific value determined by a combination of a first configuration pattern that is set in the first component carrier and a second configuration pattern that is set in the second component carrier.

The disclosure of Japanese Patent Application No. 2012-158677, filed on Jul. 17, 2012, including the specification, drawings and abstract is incorporated herein by reference in its entirety.

INDUSTRIAL APPLICABILITY

The present invention is suitable for use in mobile communication systems, for example.

REFERENCE SIGNS LIST

100 Base station
200 Terminal
101, 208 Control section
102 Control information generating section
103, 105 Coding section
104, 107 Modulation section
106 Data transmission controlling section
108 Mapping section
109, 218 IFFT section
110, 219 CP adding section
111, 222 Radio transmitting section
112, 201 Radio receiving section
113, 202 CP removing section
114 PUCCH extracting section
115 Despreading section
116 Sequence controlling section
117 Correlation processing section
118 A/N determining section
119 Bundled A/N despreading section
120 IDFT section
121 Bundled A/N determining section
122 Retransmission control signal generating section
203 FFT section
204 Extraction section
205, 209 Demodulation section
206, 210 Decoding section
207 Determination section
211 CRC section
212 Response signal generating section
213 Coding and modulation section
214 Primary-spreading section
215 Secondary-spreading section
216 DFT section
217 Spreading section
220 Time multiplexing section
221 Selection section

The invention claimed is:

1. An integrated circuit for controlling operation of a base station configured to communicate with a terminal, the integrated circuit embodying logic that is operable to:
transmit and retransmit first and second downlink data in first and second component carriers, respectively, wherein a first configuration pattern of UL (uplink) and DL (downlink) subframes is set for the first component carrier and a second configuration pattern of UL and DL subframes is set for the second component carrier; and
receive from the terminal in the first component carrier an ACK/NACK (acknowledgement/negative acknowledgement) for the first and second downlink data received by the terminal, which stores retransmission data of the first and second downlink data in a soft buffer, wherein the soft buffer for the second downlink data is sized according to a maximum number of downlink HARQ (hybrid automatic repeat request) retransmission processes executable in a reference configuration pattern of UL and DL subframes, the maximum number of downlink HARQ retransmission processes is determined according to the reference configuration pattern, and the reference configuration pattern is determined according to the first and second configuration patterns.

2. The integrated circuit according to claim 1, wherein the logic is operable to receive the ACK/NACK at a timing of an UL subframe of the reference configuration pattern.

3. The integrated circuit according to claim 1, wherein, when the first configuration pattern and the second configuration pattern are different, the logic is operable to receive the ACK/NACK at a timing of an UL subframe of the reference configuration pattern.

4. The integrated circuit according to claim 1, wherein the first component carrier is a primary cell (PCell) and the second component carrier is a secondary cell (SCell).

5. The integrated circuit according to claim 4, wherein when a set of DL subframes of PCell included in one frame includes a set of DL subframes of SCell, the reference configuration pattern is the same as the first configuration pattern.

6. The integrated circuit according to claim 4, wherein when a set of DL subframes of SCell included in one frame includes a set of DL subframes of PCell, the reference configuration pattern is the same as the second configuration pattern.

7. The integrated circuit according to claim 4, wherein when a set of DL subframes of SCell is not included in a set of DL subframes of PCell included in one frame and the set of DL subframes of PCell is not included in the set of DL subframes of SCell, the reference configuration pattern is a UL-DL configuration pattern which is DL heavy with respect to both PCell and SCell.

8. The integrated circuit according to claim 1, wherein the soft buffer stores an LLR (Log Likelihood Ratio) of the second downlink data when error is detected by the terminal, to be combined with an LLR of the second downlink data that is retransmitted.

9. An integrated circuit, which, in operation, controls a process performed at a base station configured to communicate with a terminal, the integrated circuit comprising:

transmission circuitry configured to transmit and retransmit first and second downlink data in first and second component carriers, respectively, wherein a first configuration pattern of UL (uplink) and DL (downlink) subframes is set for the first component carrier and a second configuration pattern of UL and DL subframes is set for the second component carrier; and reception circuitry configured to receive from the terminal in the first component carrier an ACK/NACK (acknowledgement/negative acknowledgement) for the first and second downlink data received by the terminal, which stores retransmission data of the first and second downlink data in a soft buffer, wherein the soft buffer for the second downlink data is sized according to a maximum number of downlink HARQ (hybrid automatic repeat request) retransmission processes executable in a reference configuration pattern of UL and DL subframes, the maximum number of downlink HARQ retransmission processes is determined according to the reference configuration pattern, and the reference configuration pattern is determined according to the first and second configuration patterns.

10. The integrated circuit according to claim 9, wherein the reception circuitry receives the ACK/NACK at a timing of an UL subframe of the reference configuration pattern.

11. The integrated circuit according to claim 9, wherein, when the first configuration pattern and the second configuration pattern are different, the reception circuitry receives the ACK/NACK at a timing of an UL subframe of the reference configuration pattern.

12. The integrated circuit according to claim 9, wherein the first component carrier is a primary cell (PCell) and the second component carrier is a secondary cell (SCell).

13. The integrated circuit according to claim 12, wherein when a set of DL subframes of PCell included in one frame includes a set of DL subframes of SCell, the reference configuration pattern is the same as the first configuration pattern.

14. The integrated circuit according to claim 12, wherein when a set of DL subframes of SCell included in one frame includes a set of DL subframes of PCell, the reference configuration pattern is the same as the second configuration pattern.

15. The integrated circuit according to claim 12, wherein when a set of DL subframes of SCell is not included in a set of DL subframes of PCell included in one frame and the set of DL subframes of PCell is not included in the set of DL subframes of SCell, the reference configuration pattern is a UL-DL configuration pattern which is DL heavy with respect to both PCell and SCell.

16. The integrated circuit according to claim 9, wherein the soft buffer stores an LLR (Log Likelihood Ratio) of the second downlink data when error is detected by the terminal, to be combined with an LLR of the second downlink data that is retransmitted.

* * * * *